Figure 1C:
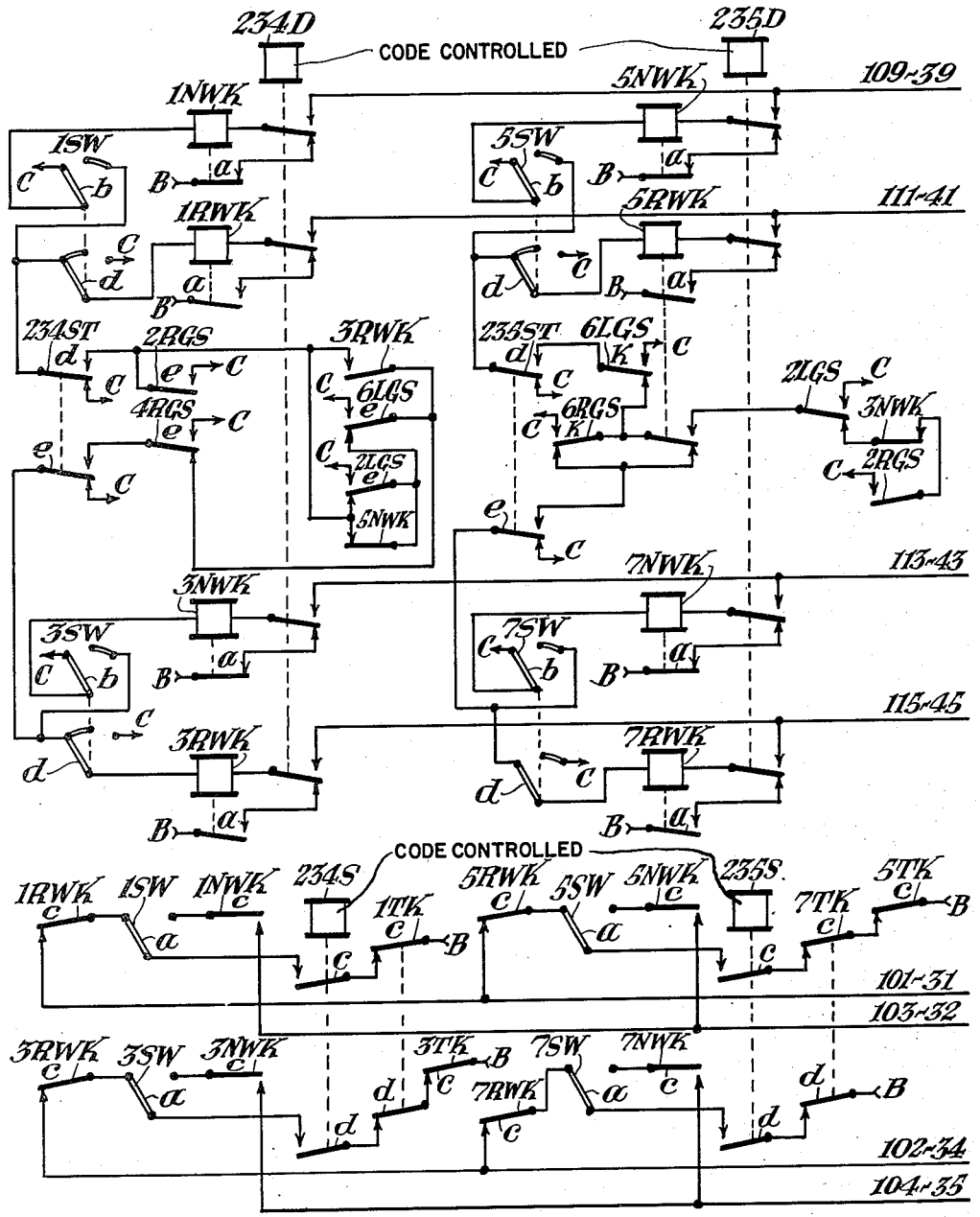

Sept. 16, 1952  F. T. PASCOE ET AL  2,611,074
CENTRALIZED TRAFFIC CONTROL SYSTEM FOR THE CODE CONTROL
OF INTERLOCKED SWITCHES AND SIGNALS
Filed June 2, 1947  10 Sheets-Sheet 1
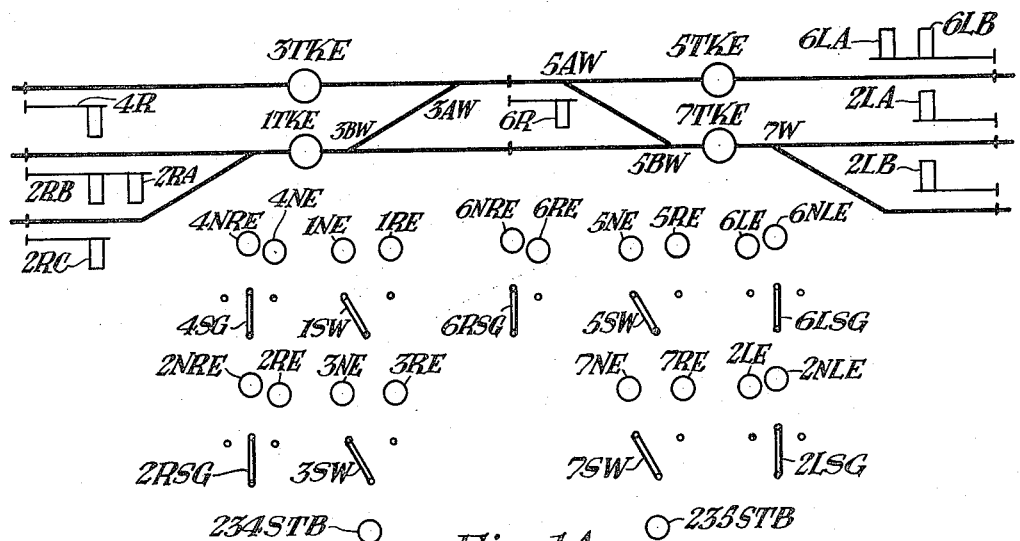
Fig. 1A.
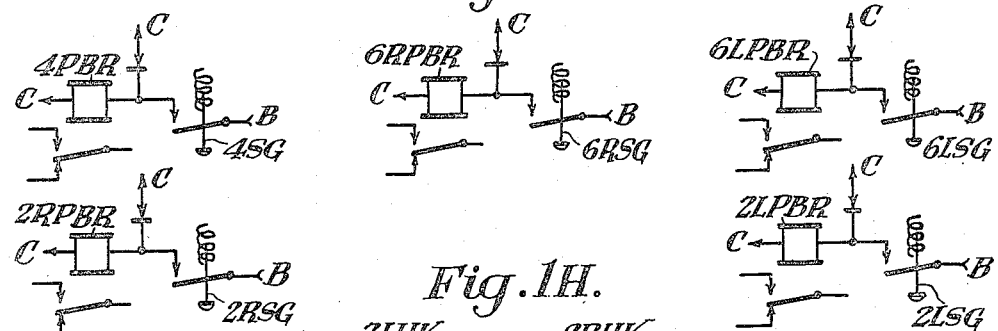
Fig. 1H.
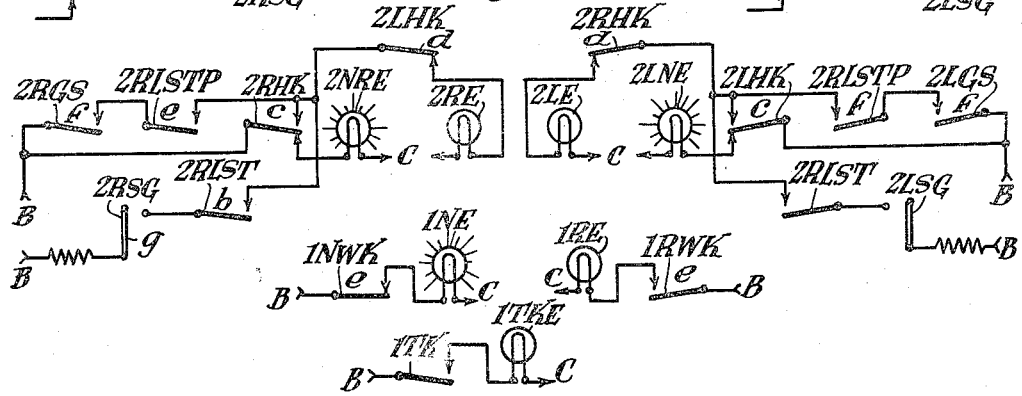
Fig. 1G.
INVENTORS.
Frank T. Pascoe and
BY Arthur L. Jerome.
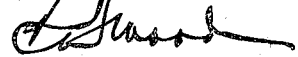
THEIR ATTORNEY

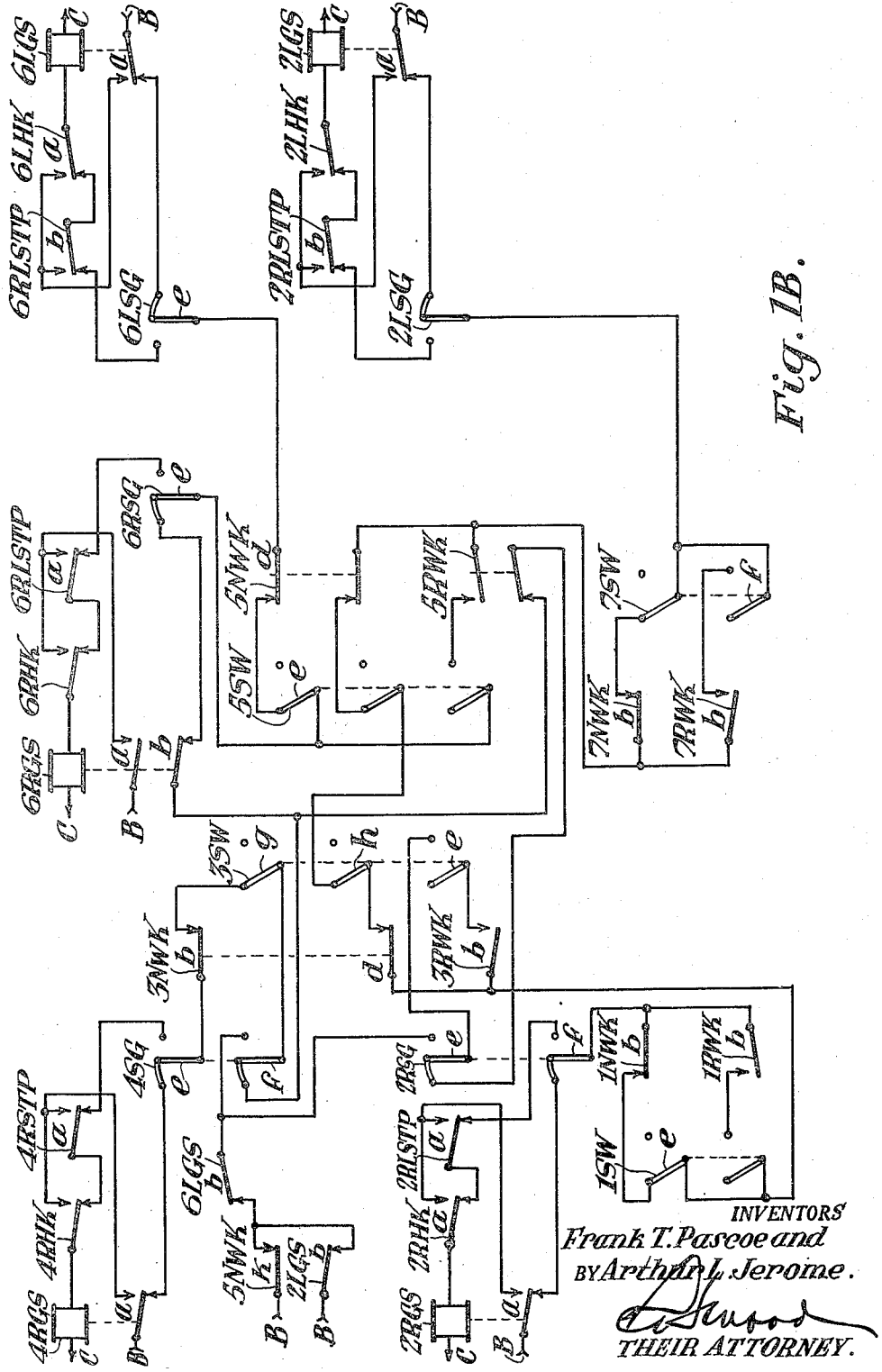

INVENTORS.
Frank T. Pascoe and
BY Arthur L. Jerome.

THEIR ATTORNEY.

INVENTORS.
Frank T. Pascoe and
BY Arthur L. Jerome.
THEIR ATTORNEY.

INVENTORS.
Frank T. Pascoe and
BY Arthur L. Jerome.
THEIR ATTORNEY.

Patented Sept. 16, 1952

2,611,074

UNITED STATES PATENT OFFICE 2,611,074

CENTRALIZED TRAFFIC CONTROL SYSTEM FOR THE CODE CONTROL OF INTERLOCKED SWITCHES AND SIGNALS

Frank T. Pascoe, Carnegie, and Arthur L. Jerome, Edgewood, Pa., assignors to Westinghouse Air Brake Company, a corporation of Pennsylvania Application June 2, 1947, Serial No. 751,908

5 Claims. (Cl. 246—3)

1

Our invention relates to centralized traffic control systems for railroads, and more particularly, to railway traffic controlling apparatus for the control of electrically interlocked track switches and railway signals from a control office.

Our invention is particularly adapted for use in connection with a selective communication system of the code type, such, for example, as the remote control system shown in Letters Patent of the United States No. 2,229,249, issued January 21, 1941, to Lloyd V. Lewis, and in its specific embodiment as disclosed herein, our invention is illustrated as arranged for use in the system of this patent.

In remote control systems of this type, the components are assembled in the form of individual storage units each identified by a selective code call. Each storage unit in the field is adapted to control and indicate a plurality of traffic governing devices, such as power operated track switches or the railway signals which govern traffic movements over the switches, and is linked, by means of its code call, with a corresponding storage unit in the office control machine which governs the transmission of control codes for effecting the operation of the switches or signals in accordance with the positions of their control levers. Each control code is initiated by pressing an individual starting button associated with the control levers of the corresponding group, or by other suitable means, and includes in addition to the code call a group of code elements reflecting the position of each of the levers of the group.

Each office storage unit also includes a group of indication stick relays which respond to indication codes transmitted by the station storage unit having the same code call, to indicate selected conditions in the field. Furthermore, the system is arranged to transmit the codes one at a time over a single line circuit, without interference, codes originating at the same time, or while the line circuit is in use, being transmitted one at a time in a given order of code superiority.

In the application of the remote control system to the control of traffic on single track railroads, where generaly each station includes only one track switch, the preferred mode of operation is to include in the same control code elements for changing the position of the switch and for clearing a signal which governs train movements over the switch. On the other hand, in the application of the system to interlocked track layouts including a plurality of track switches, it is sometimes preferred to delay the transmission of the signal clearing code until indications have been

2 received that each switch of the route has assumed the desired position.

In interlocked track layouts having a plurality of track switches establishment of a route may involve movement of more than one track switch. If movement of each track switch necessitates transmission of a separate control and indication code, a large number of such codes will be required, and preparation of routes through the track layout may be delayed because of delay in the transmission of the control and indication codes.

The system of our invention is of the type in which the control apparatus at the office is so arranged that any route through a track layout involving one or more track switches may be set up by positioning the switch levers to indicate the route desired, reversing the signal lever for the entering signal, and then pressing the starting button associated with the operated signal lever. If preferred, the signal levers may be of the push-turn type so that each signal lever incorporates a starting button which may be operated during movement of the lever. If the signal levers incorporate the starting buttons, it is preferred to have the levers arranged so that the levers may be moved without operating the starting buttons, and so that the starting buttons may be operated without moving the levers.

Each signal starting button when depressed always establishes a circuit for energizing the starting relay for the storage unit controlling the signal with which the starting button is associated. Each signal starting button when depressed may also establish circuits for energizing the starting relay or relays for one or more additional storage units controlling the track switches so that all of the control codes nesssary to establish a complete route are initiated by pressing of a single starting button. Each of the circuits governed by a signal starting button for energizing a starting relay for an additional storage unit is automatically controlled so as to be established only when the route set up requires transmission of a control code by the additional storage unit, thereby to insure transmission of all essential control codes and at the same time prevent transmission of unnecessary control codes.

Thus it follows that in case the establishment of the desired route requires the operation of a switch and of a signal, the pressing of the appropriate starting button for the signal lever not only initiates, or stores for transmission, a signal clearing code, as heretofore, but also initiates the transmission of another code for operating the switch, the transmission of which precedes that of the signal clearing code. The equipment is arranged so that the transmission of the signal clearing code is delayed until an indication code is received which indicates that the switch occupies the position designated by the controlling switch lever, whereupon the signal control code is automatically transmitted without further effort on the part of the operator.

The system is arranged so that the operation of only one starting button is required to establish a route, even though the transmission of several different control codes is required in order to set up the route, and each switch operating code is initiated only when the switch control lever is out of correspondence with the indicated position of the switch, thereby avoiding the transmission of idle codes containing control elements for switches which already occupy the required positions.

A feature of our invention is that the control and indication of all of the track switches in a layout is concentrated in a minimum number of storage units whereby to enable any route through the layout to be established with a minimum number of codes.

One object attained by our invention is the provision of improved means for insuring that the code for clearing the signal will be the last of the series of route establishing codes to be transmitted, regardless of the order of superiority of the different codes. In this respect this invention is an improvement upon that disclosed in an application for Letters Patent of the United States, Serial No. 649,598, filed February 23, 1946, by Arthur L. Jerome, Lloyd V. Lewis and Frank T. Pascoe, for Centralized Traffic Control Systems of the Code Type for the Control of Interlocked Track Switches and Railway Signals, and is similar to that disclosed in an application for Letters Patent of the United States, Serial No. 708,920, filed by us on November 9, 1946, now Patent No. 2,576,038, granted November 20, 1951, for Centralized Traffic Control System for the Code Control of Interlocked Switches and Signals.

The principal feature of this invention is the provision of improved means for selectively controlling each of a plurality of signals through a single storage unit.

A further feature of this invention is the provision of improved means of the type described which is arranged so that the transmission of the control code for clearing each of a plurality of signals governed through a storage unit is automatically initiated when the route governed by the signal is indicated to be complete, and so that the control code governing each signal neither interferes with nor is interfered with by the control code for governing other signals controlled through the same storage unit.

Another feature of the invention is the provision, in a system of the type described in which a route relay at the office is locked energized when a control code for clearing the associated signal is transmitted, of improved means at the field location which operates in such a manner that as soon as a control code is received at a field station to clear a signal, the circuits governing transmission of indication codes for showing the condition of this signal are controlled to insure that either the "signal clear" or "approach locked" indication will be transmitted to the office whereby to prevent premature release of the route locking relay at the office.

Another object of this invention is to provide improved means for selectively governing a plurality of functions through a single field station in such a manner that while control of any one of the functions may be initiated at any time, the transmission of the control code for each function is deferred until predetermined conditions exist, whereupon the code is automatically transmitted, the equipment being arranged so that transmission of the control code for performing one function does not interfere with the storage of the control code for another function.

A further object of this invention is to provide improved means of the type described which is arranged so that where a plurality of signals are governed through a single field station the control code for clearing any one of the signals is transmitted when the route relay in the office for that signal shows that the route governed thereby is complete, and so that transmission of the control code for clearing a signal actuates means in the office for locking the route relay for that signal and does not affect the route relays for other signals governed through the same field station.

Another object of the invention is to provide improved means of the type described which operates so that the operator is always able to transmit a control code to put a signal to stop or to hold it at stop, and so that a control code for this purpose will always be transmitted promptly irrespective of the condition of the route relay or other apparatus at the office.

Figure 1D:
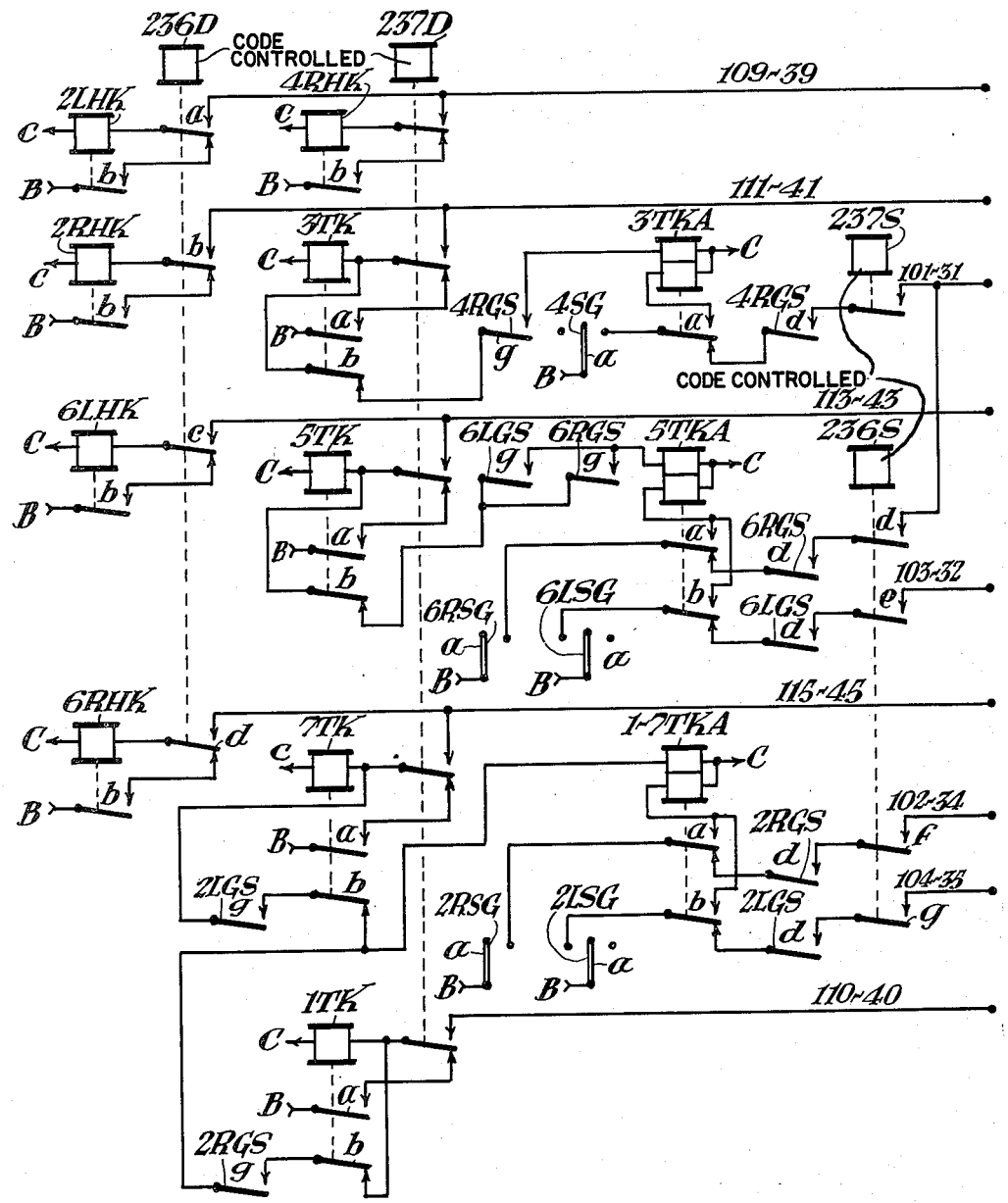

Referring to the accompanying drawings, Fig. 1A shows the operator's control panel; Figs. 1B to 1H, inclusive, show the circuits and apparatus associated therewith at the control office; Fig. 2A shows a typical track layout chosen to illustrate our invention; Figs. 2B to 2H, inclusive, and Figs. 2J and 2K show the wayside circuits and apparatus.

Similar reference characters refer to similar parts in each of the views:

To simplify the circuits, we have herein shown only the terminals of the sources of current for energizing the various relays, the reference character B designating the positive or supply terminal and the reference character C the negative or common return terminal of the local source of current, in each instance.

In some instances, in order to simplify the drawings, relay contacts are shown separated from the relay winding and where this is done the relay with which the contacts are associated is indicated by suitable reference characters placed above the contacts.

To illustrate our invention we have shown an interlocking control system of a conventional type in which all operations for the protection of traffic movements are controlled locally and are governed over a communication system from a central office. Our invention relates principally to the apparatus at the central office and involves assigning switch and signal controls and indications to the various coding units so that certain units are used for the control and indication of track switches only while others are used for the control and indications of signals only. Starting relay means are provided for each coding unit, there being a single starting relay for units assigned to the control of track switches only, such as the relays 234ST and 235ST of Fig. 1E for the coding units 234 and 235, respectively, and there being two starting relays, such as relays 2RLST and 6RLST of Fig. 1F, for the coding unit controlling two sets of signals, such as the unit 236 which controls a first group of signals 2RA, 2RB, 2RC, 2LA and 2LB, and a second group of signals 6LA, 6LB and 6R, shown in Fig. 2A. The invention also involves the provision of a repeater relay for each of the starting relays for the coding units controlling the signals, the repeater relay 2RLSTP of Fig. 1F for the starting relay 2RLST being typical. Signal clearing relays, such as 2RGS, provided for each signal control lever and controlled over a conventional route circuit network of Fig. 1B, also are employed.

Each starting relay for the coding units assigned to switch control only, such as the relay 234ST for coding unit 234, is arranged to become energized whenever the starting button for that coding unit, such as button 234STB of Fig. 1A for unit 234, is actuated, or whenever the starting button for a signal control lever is actuated, provided that the signal lever governs traffic over a switch controlled by that coding unit and the control lever for that switch is out of correspondence with the indicated position of the switch. Each such starting relay is effective to initiate or store for transmission, a control code from the associated coding unit as soon as such starting relay becomes energized. Each starting relay for the coding units assigned to signal control only, such as relay 2RLST of Fig. 1F, is arranged to become energized when the starting button of the associated signal control lever is actuated to pick up its push button repeater relay, such as the relay 2RPBR of Fig. 1H controlled by the push button of signal lever 2RSG. The starting relay for the signal control coding unit, when picked up in the manner described, remains energized over a stick circuit until the associated coding unit transmits its code, or until manually released by the operation of a cancelling button CB. Each such starting relay when energized prepares a starting circuit shown in Fig. 1F for its associated coding unit, which circuit is completed over a contact closed by the signal lever when reversed, and a contact closed when the signal clearing relay for that lever is energized.

Each signal clearing relay, such as the relay 2RGS, when energized not only completes the starting circuit for the associated coding unit, but also completes the circuit for the repeater relay provided for the associated starting relay, such as the repeater relay 2RLSTP provided for the starting relay 2RLST of Fig. 1F. Each repeater relay when picked up in turn completes a stick circuit for the associated signal clearing relay, this stick circuit serving to hold the signal clearing relay energized independently of the route circuit network.

At the station the indication coding units are controlled so as to initiate the transmission of an indication code as soon as a signal clearing code is received, thereby to transmit to the office either a "signal clear" or an "approach locked" indication, the receipt of which is utilized to maintain the signal clearing relay at the office energized independently of the route circuits and superseding the stick circuit provided by the repeater relay of the starting relay.

When our invention is used, the operator may set up any of the routes through the interlocking and clear the signal therefor, by positioning the switch levers to indicate the course of the route and by reversing the signal lever which governs train movements over the route in the desired direction, and then pressing the starting button forming a part of, or associated with, that signal lever.

Figure 1E:
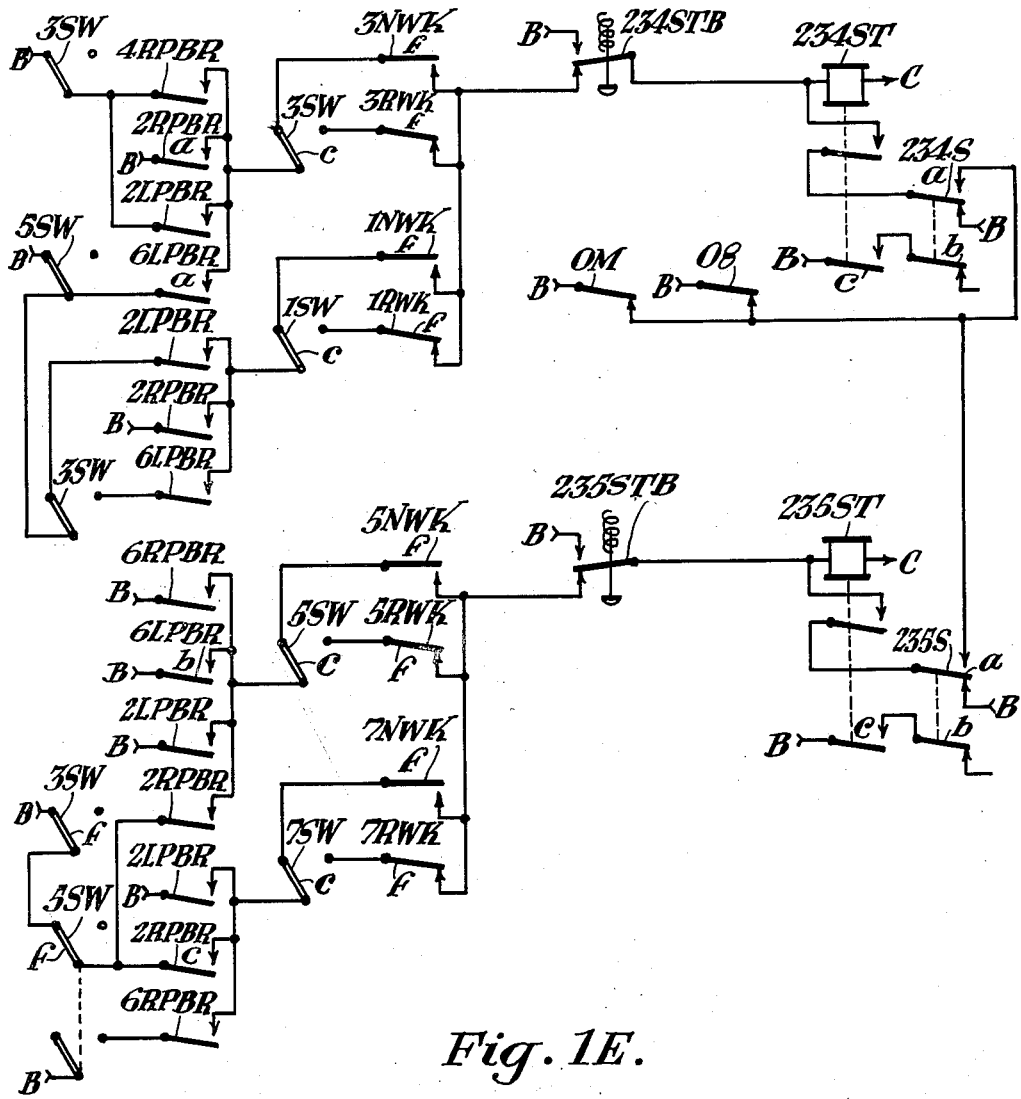
Figure 1F:
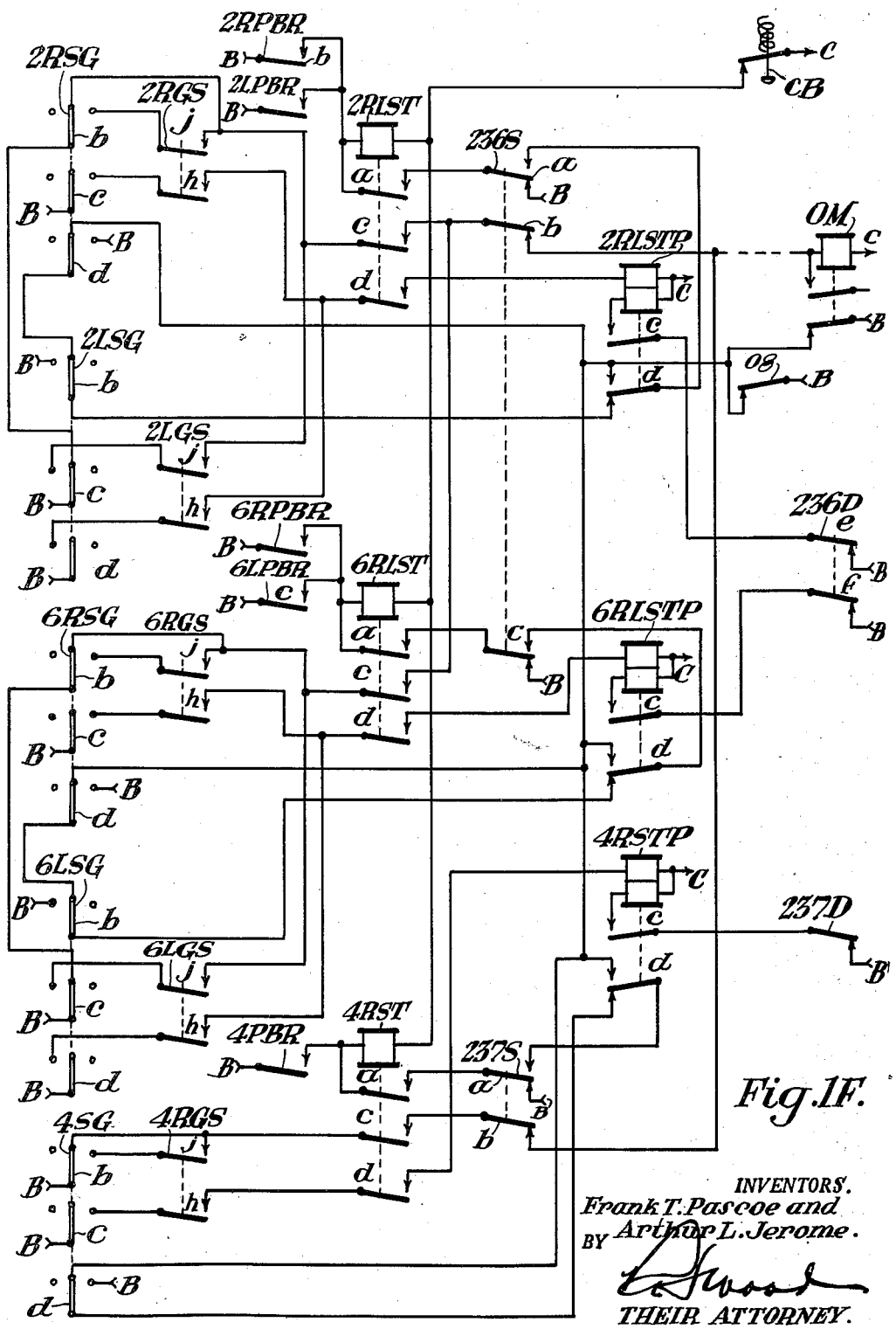
Figure 2A:
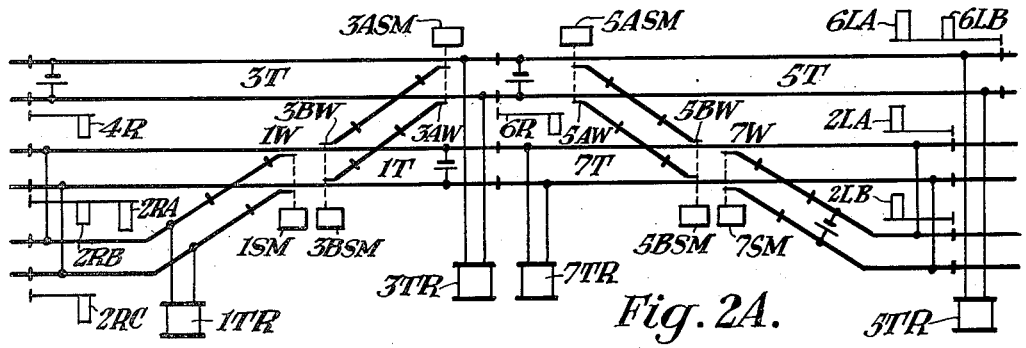
Figure 2B:
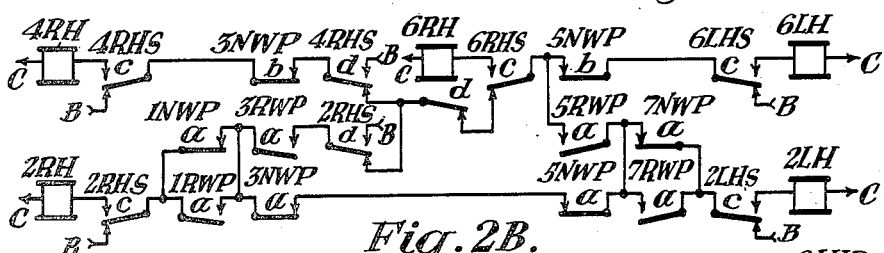

When the starting button for a signal lever is operated, it picks up an associated push button relay which closes contacts in the circuits of the starting relays shown in Figs. 1E and 1F. For example, if the button for signal lever 2RSG is operated, push button relay 2RPBR of Fig. 1H is picked up, and closes contacts in Fig. 1E which complete circuits to pick up one or more starting relays, such as relays 234ST and 235ST, for storage units controlling the track switches, provided that any of the switches are in positions which must be changed to establish the desired route. In Fig. 1F the push button relay when picked up closes contacts to pick up a starting relay provided for the code unit controlling the signal governed by the reversed signal lever. The push button relay 2RPBR, for example, when energized picks up the starting relay 2RLST (which together with starting relay 6RLST constitute the starting relay means for the coding unit 236 controlling the two groups of signals controlled by the signal levers 2RGS, 2LGS and 6LGS, 6RGS).

The starting relays for the coding units assigned to switch control only, when picked up complete the usual code initiating circuits over their contacts c (Figure. 1E) to initiate the transmission of code from the associated coding units, but the corresponding circuits including contacts c of the signal code starting relay in Fig. 1F is held open at a contact j of a signal clearing relay, such as the relay 2RGS governed over the route circuit network of Fig. 1B.

The switch control codes are thus transmitted first. The character of the code steps for operating the switches are controlled over the circuits of Fig. 1C in such a manner that they are effective only if the switches are free to be operated at the time, and not, for example, if the switch is included in a conflicting route already established. The circuits of Fig. 1C for this purpose correspond generally to the analogous circuits of the Jerome, Lewis and Pascoe prior application, Serial No. 649,598, hereinbefore referred to.

When the route is fully established as indicated by the operation of the switch indication relays NWK and RWK of Fig. 1C to correspond with the positions of the switch levers SW, the signal clearing relay of Fig. 1B, such as 2RGS, picks up to close its contact j in Fig. 1F to initiate the code, and also closes a contact h in Fig. 1F to pick up a code indicator or starting relay repeater 2RLSTP, which relay isolates the signal clearing relay from the route circuit network of Fig. 1B and holds it energized until an indication is received of the response of the signal to its control code.

The character of the signal control steps of this code are goverened by the signal lever and the associated signal clearing relay in the manner shown in Fig. 1D, which circuits also correspond to those of the Jerome, Lewis and Pascoe application, Serial No. 649,598.

The signal clearing relay 2RGS is held energized by the associated signal indication relay 2RHK which when energized indicates either that the signal is at clear, or if the associated indication relay 2LHK is also energized, that the approach or time locking for the signal is in effect, following the manual return of the signal to stop, the wayside circuits for controlling relay 2RHK for this purpose being shown in Fig. 2K. A novel feature of the present case is the addition of contacts of the signal control relays RHS and LHS to the indication control circuits of Fig. 2K, for purposes hereinafter pointed out.

Having thus described the principal features of our invention, we will now describe the system in detail.

*The wayside circuits and apparatus*

As herein disclosed, the apparatus of our invention is represented applied to the control of a typical arrangement of track switches and wayside signals. The wayside apparatus and circuits are in general similar to those shown in the aforementioned Jerome et al. application, Serial No. 649,598, with the track layout shown in Fig. 2A being identical with that of the Jerome et al. application, comprising two main tracks of a double track railroad connected by the crossover switches 3AW—3BW and 5AW—5BW, the lower track also including two single switches 1W and 7W. Main line train movements over the tracks of the layout are governed by the high speed signals 2RA and 6LA, and other movements by the slow speed signals 2RB, 2RC, 2LA, 2LB, 4R, 6R, and 6LB, located as shown. The tracks are divided into sections by insulated joints to form the detector track sections 1T, 3T, 5T and 7T, each having the usual track circuit provided with a normally energized track relay designated by the reference character TR with a numerical prefix corresponding to the numerical prefix of its associated detector section.

The track switches W are operated by power operated switch and lock mechanisms SM controlled by polarized switch operating relays WZ, it being understood that each mechanism SM and controlling relay WZ is identified by a prefix corresponding in each case to the prefix (1, 3A, 3B, etc.) of the associated track switch. Preferably the circuits for the relays WZ shown in Fig. 2E are arranged to incorporate a suitable overload relay OR, as shown, these circuits being arranged as shown and described in Letters Patent of the United States No. 2,124,601, issued July 26, 1938, to Norman F. Agnew et al., for Railway Switch Controlling Apparatus.

In Fig. 2E, and likewise in other views involving a plurality of similar sets of circuits, only one set of each type is shown in detail. Thus it is to be understood that the circuits for relay 7WZ, for example, controlling switch 7W, are similar to those shown for relay 1WZ, and that those for the crossover switches 5AW—5BW are similar to those shown for the switches 3AW—3BW.

Each individual track switch (1W and 7W) and each crossover (3AW, 3BW and 5AW, 5BW) is controllable under proper locking conditions as reflected by the locking relays LR of Fig. 2J, by a switch control relay designated by the reference character WSR with a numerical prefix corresponding to the numerical prefix of the associated track switch or crossover. Each WSR relay as shown is of the polar stick type and each such relay replaces the pair of neutral stick relays NWS and RWS provided for the station storage unit of Fig. 8 of the Lewis patent, it being understood that the switch control relays WSR are controlled by codes which reflect the positions of the corresponding switch levers, such as lever 1SW of Fig. 1A.

Figure 2C:
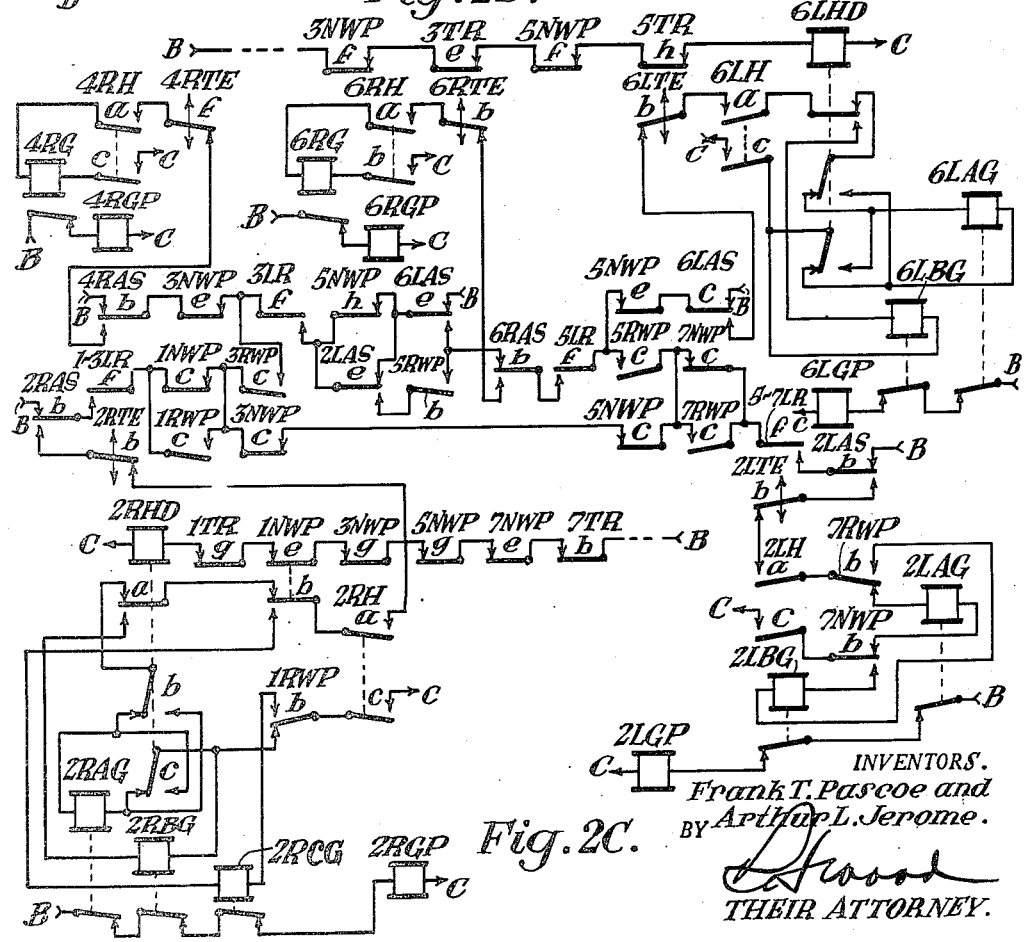
Figure 2D:
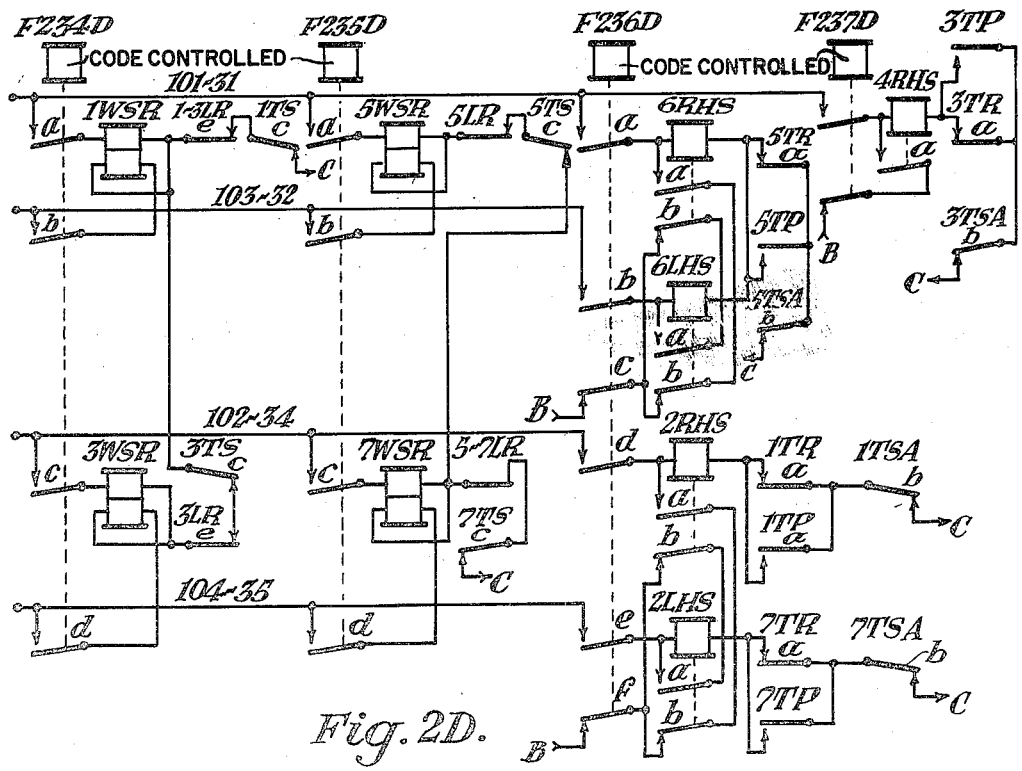
Figure 2E:
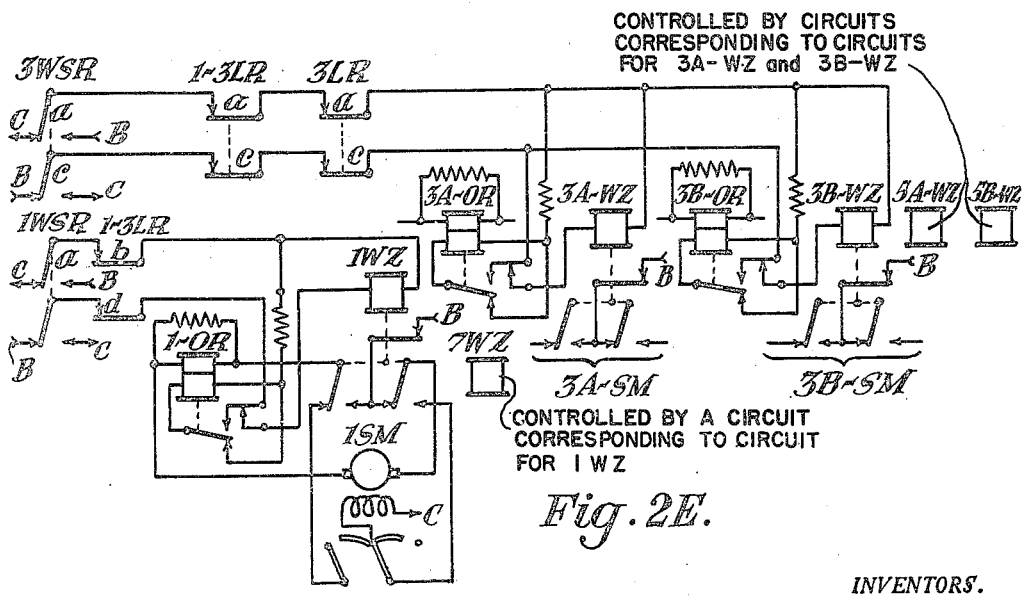
Figure 2F:
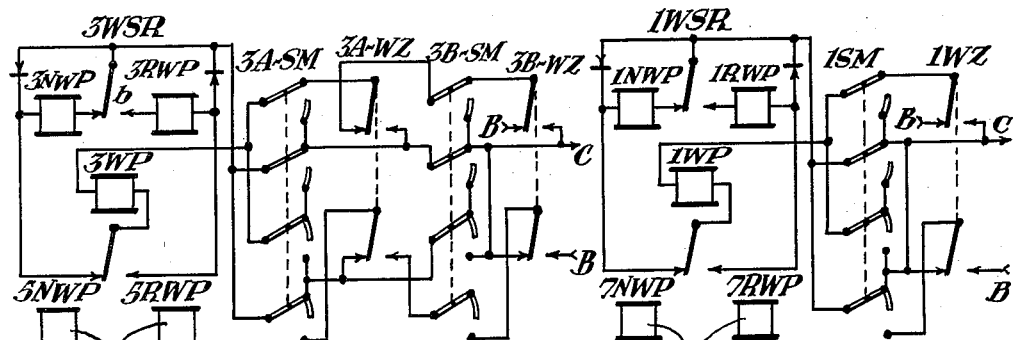
Figure 2G:
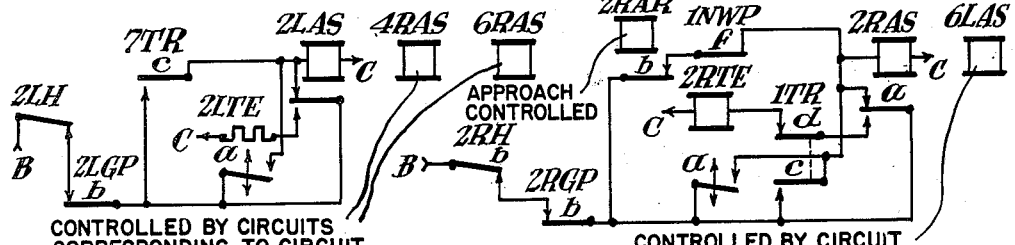

Each switch SM, together with the associated switch operating and control relays WSR and WZ, controls a polarized switch indication relay WP, and normal and reverse repeating relays NWP and RWP, shown in Fig. 2F. The circuits of Fig. 2F are arranged as shown and described in Letters Patent of the United States No. 2,351,495, issued June 13, 1944, to Arthur E. Dodd, for Electrical Control Apparatus. Each switch repeating relay NWP or RWP when energized indicates that the associated switch or crossover, as the case may be, is locked in the normal or reverse position, respectively, and also that the associated switch operating and control relays are in the corresponding normal or reverse position. The switch repeating relays NWP and RWP govern the route circuits of Fig. 2B, the signal circuits of Fig. 2C, the locking circuits of Figs. 2G, 2H and 2J, and also govern the transmission of indications of switch position to the office as shown in Fig. 2K.

Each of the signals of Fig. 2A is to be understood to be of the well-known searchlight type, having a mechanism conventionally represented in Fig. 2C, and identified by the reference character G, prefixed by the designation of the signal, and controlled over a circuit network conforming to the track layout. The circuits for the mechanisms G are prepared by the energization of route relays, designated by the reference character H with suitably distinguishing prefixes, which are controlled over route circuits shown in Fig. 2B, by the signal control relays HS of Fig. 2D, and by the switch repeating relays NWP and RWP of Fig. 2F, in such a manner that each route relay H becomes energized in response to the energization of the corresponding signal control relay HS only when each track switch of the route governed thereby has assumed a position in agreement with that of its control relay WSR.

As shown in Fig. 2C, the mechanisms 2RAG and 6LAG for the high speed signals 2RA and 6LA are reversibly controlled by polarized line relays 2RHD and 6LHD in a conventional manner to indicate "caution" or "proceed" when energized in a normal or reverse direction, and to indicate "stop" when deenergized. The remaining signals of Fig. 2A govern slow speed movements only, and all their mechanisms are arranged to indicate "caution slow speed" when energized and to indicate "stop" when deenergized.

Each individual signal and each group of signal mechanisms in Fig. 2C controls a conventional stop indication repeating relay designated by the reference character GP with a suitably distinguishing prefix, which relay as shown in Fig. 2C is arranged to be energized only when its associated signal or signals indicate stop. Each signal repeating relay GP together with the associated route relay H controls a locking stick relay AS shown in Fig. 2G in a conventional manner such that when any route relay H becomes energized to prepare a signal circuit in Fig. 2C, the associated locking stick relay AS of Fig. 2G releases to close its back contact b in the circuit of Fig. 2C prepared by the route relay H for the associated signal mechanism G. Thus for example when relay 2RH (Fig. 2B) is picked up, its associated locking stick relay 2RAS (Fig. 2G) is released and back contact b of the latter closes in the circuit (Fig. 2C) prepared by relay 2RH for the group of signal mechanisms 2RAG, 2RBG and 2RCG. The circuit for this group of signal mechanisms will be traced in detail hereinafter, but it is to be seen from Fig. 2C that the stop indication repeating relay 2RGP provided for this group of signal mechanisms is released so long as any of such mechanisms is energized and that relay 2RGP when energized holds open its front contact b in the circuit (Fig. 2G) of locking stick relay 2RAS so that the latter is released as long as relay 2RGP is released.

The stop indication repeater relays GP (Fig. 2C) approach or time locking relays AS (Fig. 2G) and signal control relays HS (Fig. 2D) govern the transmission of signal indications by the code system as represented in Fig. 2K, the arrangement being (for all signals except 4R) such that when a relay GP is released, the associated terminal in the field is deenergized, and when the relay GP is picked up the associated terminal is energized provided that its associated approach locking relay AS or signal control relay HS is energized. The indications transmitted to the office on the clearing of a signal result in the energization of the associated signal indication relay HK (of Fig. 1D) as will be made clear presently.

As shown in Fig. 2J, a conventional switch locking relay LR is provided for each switch section and is controlled in the usual manner by the track relay TR of the same section. Each relay LR, when released, locks the switch or switches in its section by opening its front contacts in the circuits for the control and operating relays WSR and WZ, as shown in Figs. 2D and 2E. In addition, the conventional section locking relays ES and WS (Fig. 2H) are employed.

Figure 2H:
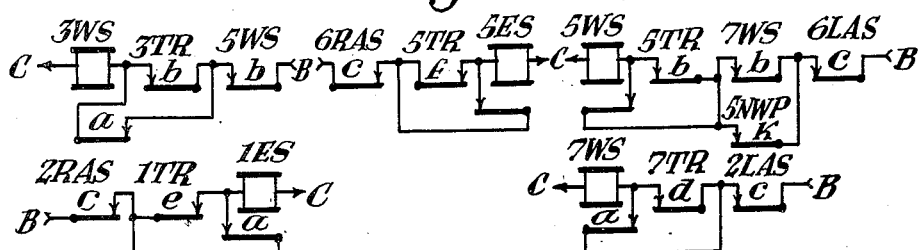
Figure 2J:
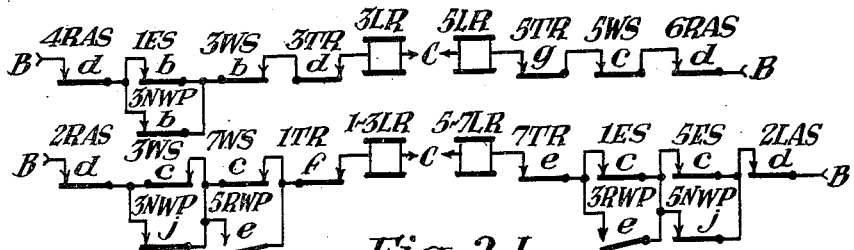
Figure 2K:
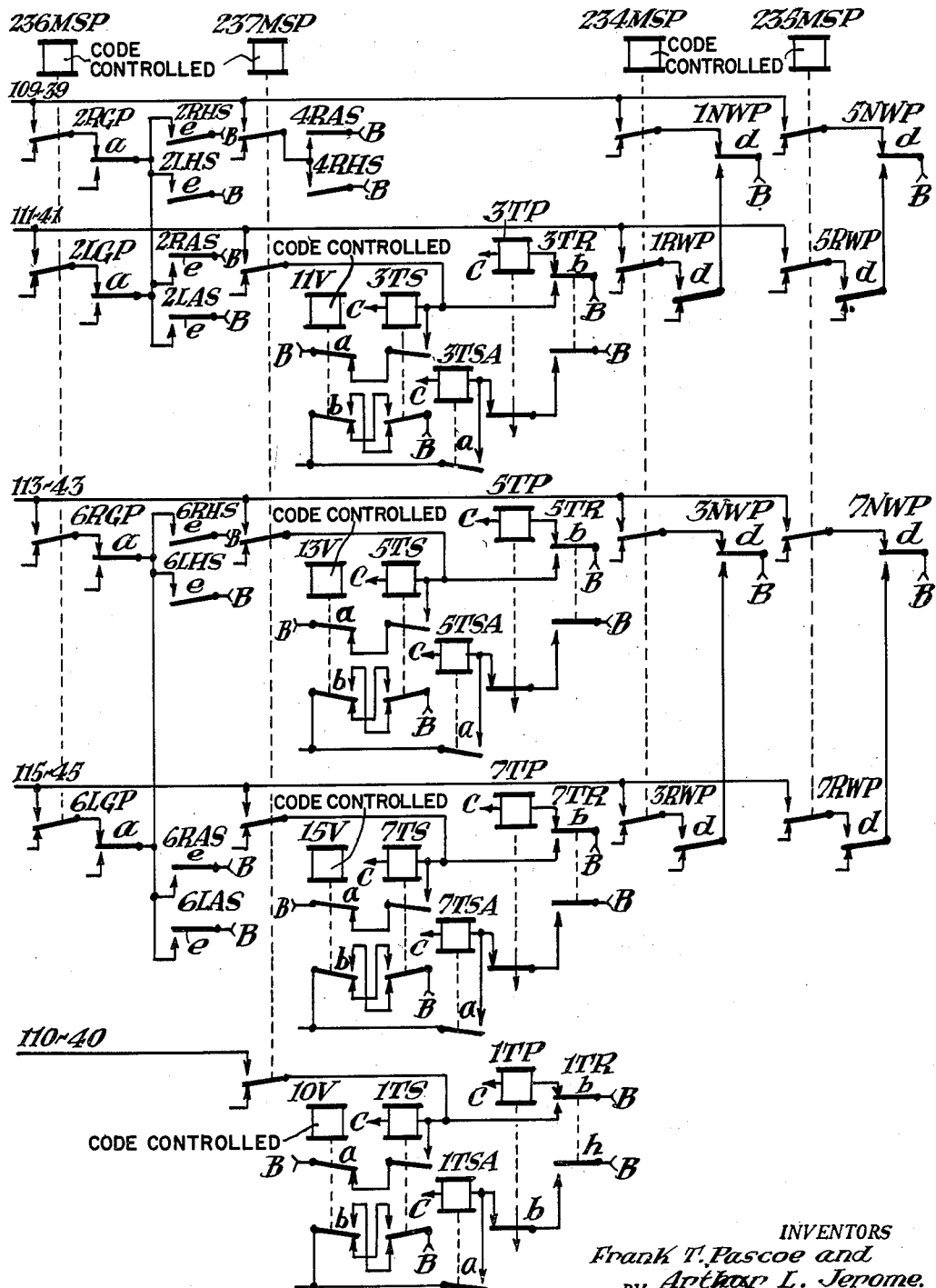

Each locking stick relay AS (Fig. 2G) controls in the conventional manner the circuit for the switch locking relay LR for the first section of the route to cause it to release when the locking stick relay releases, and also releases one or more of the section locking relays of Fig. 2H to cause the release of the relays LR for the succeeding sections of the route. For example, if relay 2RAS releases, it in turn releases switch locking relay 1—3LR (Fig. 2J) and section locking relay 1ES (Fig. 2A). The release of relay 1ES in turn releases switch locking relay 3LR (Fig. 2J) if crossover switches 3AW—3BW are reversed so that contact b of relay 3NWP is open, or switch locking relay 5—7LR (Fig. 2J) if the crossover switches are normal and contact e of relay 3RWP is open. The release of a locking stick relay AS therefore acts to hold the switch locking relay LR for each section in the route released to lock the switches located therein until a train occupying the route reaches the corresponding section and locks the switches by the release of the track relay TR thereof.

Returning now to Fig. 2C, it will be seen that the system operates in the conventional manner so that the clearing of any signal is made dependent upon the release of the associated locking stick relay AS and also upon the locking of the switches controlled thereby. The signal circuits (Fig. 2C) prepared by the route relay 2RH, for example, include a back contact b of the locking stick relay 2RAS and also include back contacts of the switch locking relay LR for each switch of the route. Furthermore, each signal circuit is connected to the B terminal of the source of current over a front contact of the locking stick relay AS for the opposing signal of the same route, thereby providing either time or approach locking protection against the improper reversal of the direction of traffic movements. For example, the circuits shown in Fig. 2C for the group of signal mechanisms 2RAG, 2RBG and 2RCG are typical. One or the other of these three mechanisms, selected over contacts b of relays 1NWP and 1RWP and contacts a, b, and c of relay 2RHD in a manner obvious from an inspection of Fig. 2C of the drawing, is energized when front contact a of relay 2RH, back contact b of relay 2RAS, and back contact f of relay 1—3LR are closed, provided that the route is properly set up and the locking stick relay for the opposing signal of that route is picked up. Thus, if signal 2RA is to be cleared for a movement on the lower main track to opposing signal 2LA, mechanism 2RAG gets energy over the previously mentioned contacts of relays 2RH, 2RAS and 1—3LR, and is connected to terminal B over front contact c of relay 1NWP (connected to the heel of contact f of relay 1—3LR), front contacts c of relays 3NWP, 5NWP and 7NWP, back contact f of relay 5—7LR, and front contact b of relay 2LAS. If signal 2RB is to be cleared for a low speed movement from that signal to either signal 6R or 2LB, the heel of contact f of relay 1—3LR is connected to terminal B in the first case, over front contact f of relay 3LR, front contact h of relay 5NWP or front contact e of relay 2LAS in multiple, and front contact e of relay 6LAS; and in the second case is connected to terminal B over front contacts c of relays 1NWP, 3NWP, 5NWP and 7RWP, back contact f of relay 5—7LR and front contact b of relay 2LAS. If signal 2RC is to be cleared, the heel of contact f of relay 1—3LR is connected through front contact c of relay 1RWP to terminal B at front contact e of relay 6LAS over a circuit previously traced if crossover 3AW—3BW is reversed; and to terminal B at front contact b of relay 2LAS if the crossover is normal.

Each of the signals, as shown, is arranged to be put to stop automatically when a train enters the first track section of its route, remaining at stop after the first section is vacated, due to the release of the associated signal control relay HS shown in Fig. 2D by contact a of the corresponding track relay TR, the signal control relay upon releasing causing the corresponding route relay H of Fig. 2B to release to open the signal circuit of Fig. 2C. Under the conditions assumed, the circuit of the signal control relay HS (Fig. 2D) is also opened at the back contact b of a track storage repeater relay TSA (Fig. 2K) which relay picks up in response to the release of the associated track relay TR, and when picked up is maintained picked up by an associated track storage relay TS also shown in Fig. 2K. Relay TS is picked up when the track relay releases and controls the transmission of the indication code by which the track indication relay TK is energized to light a lamp TKE on the track diagram at the office to indicate the occupancy of the controlling track section, and is held energized to insure the transmission of the track occupied indication even though the section is vacated before the system has an opportunity to transmit the indication, as explained in the Lewis patent. When the track occupied indication is transmitted, the associated relay V picks up in the manner explained in the Lewis patent to interrupt the circuit of the relay TSA and it releases to close its back contact b in the circuit of the signal control relay. Accordingly, after a signal has been put automatically to stop, it cannot be cleared again by the transmission of a signal clearing code until an indication is transmitted to the office that the first section of the route has been occupied, but after this indication code has been transmitted to the office the signal control relay can be picked up by a control code if the operator wishes to reclear the signal for a following train.

One purpose of this arrangement is to prevent the inadvertent reclearing of a signal which has been put automatically to stop, in the event the transmission of the track occupied indication is delayed until after the controlling track section is vacated.

Energization of a track indication relay TK at the office is accompanied by energization of an auxiliary or slotting relay TKA (Fig. 1D), which thereupon remains energized until the associated signal lever is restored to its normal position. Each auxiliary or slotting relay is energized upon energization of the associated track indication relay TK only when a route relay for a signal governing entrance of traffic into that section is picked up so that a signal clear control code could be transmitted unless prevented by the slotting relay. Each auxiliary or slotting relay when energized interrupts the circuits governing transmission of control codes for clearing the associated signal. As a result after a signal has been put to stop by passage of a train and an indication of occupancy of the section in advance of the signal has been transmitted to the office, a control code for reclearing the signal will not be transmitted until the operator restores the signal lever to normal to release the associated slotting or auxiliary relay. This arrangement prevents inadvertent reclearing of a signal which has been put automatically to stop, in the event control codes for performing other functions are transmitted to the field station through which the signal is controlled.

Referring again to Fig. 2G, it will be seen that when a signal is put automatically to stop, the locking stick relay AS for that signal is picked up in the usual manner over back contact c of the track relay for the first detector section of its route, and contacts of that track relay TR hold open the circuits for the associated section locking relays and switch locking relay LR for the switches farther on in the route, until that first detector section is vacated, each track relay locking the track switch in its associated detector section through the associated locking relay LR until the corresponding section is vacated, to provide the usual "sectional release" of switch locking. For example, if after signal 2RA has been cleared, it is put to stop by a train entering section IT, relay ITR releases and closes its back contact c to pick up relay 2RAS (Fig. 2G). Front contacts e and f of relay ITR are now open and hold open the circuits of relays IES (Fig. 2H) and I—3LR (Fig. 2J). Relay IES holds its front contact c open in the circuit of relay 5—7LR (Fig. 2J).

When a track relay releases, its associated track stick relay TS (Fig. 2K) picks up and in Fig. 2D, it will be noted that a back contact c of the track storage relay TS above referred to is included in the circuit of the switch control relay WSR for each switch in the corresponding section, that is, the circuit of relay IWSR includes back contact c of relay ITS, and that of relay 3WSR includes back contacts c of relays ITS and 3TS. These contacts serve to prevent the reception of the switch control elements of a code while the switch section is occupied, prior to the transmission of an indication of its occupancy to the office. After the track occupied indication is transmitted, the transmission of code elements for changing the position of a switch located in an occupied track section is prevented by the opening of the back contacts c and d of the track indication relays TK, in the circuits of Fig. 1C.

The arrangement of the wayside apparatus and circuits of our system is substantially similar in many respects to the corresponding apparatus of the Jerome et al. application, Serial No. 649,598, differing therefrom largely in the organization of the apparatus shown in Fig. 2D for delivering the control codes, and in the apparatus shown in Fig. 2K for transmitting indication codes. In accordance with our invention, the control codes and indications are assigned to the various code storage units so that certain units control and indicate track switches only, while other units control signals only and (in one case) indicate only signals or (in another case) indicate both signals and track occupancy. Referring to Fig. 2D, it will be seen that unit 234 controls switch control relays IWSR and 3WSR; unit 235 controls switch control relays 5WSR and 7WSR; unit 236 controls signal control relays 6RHS, 6LHS, 2RHS, and 2LHS; and unit 237 controls signal control relay 4RHS. A corresponding arrangement is shown in Fig. 2K for the indication codes, the unit 234 indicating the positions of the points of switch IW and crossover 3AW—3BW; the unit 235 indicating the positions of the points of the crossover 5AW—5BW and switch 7W; unit 236 indicating the signals governed by signal control relays 2RHS, 2LHS, 6RHS, 6LHS; and the unit 237 indicating the signal controlled by relay 4RHS, and also indicating the detector track sections IT, 3T, 5T, and 7T. The apparatus of Fig. 2K is further arranged in a novel manner so that the circuits for the units 236 and 237 include contacts of the signal control relays HS, whereby each of such units is caused to transmit a code immediately when a signal clearing code has been received by such unit.

*The code communication system*

It has already been pointed out that the centralized traffic control system of our invention may employ the code system of Patent No. 2,229,249, of which the field storage units are illustrated in part in Figs. 2D and 2K. For an understanding of our invention, it is deemed sufficient to point out that the communication system may be arranged to provide a plurality, such as seven, code steps or channels, for the intermittent transmission of controls from the office to a selected storage unit in the field, as well as a similar number of other channels for the transmission of indications from any of the field storage units to the office.

This system makes use of four channels in the transmission of control codes from the office to the field stations, and of five channels in the transmission of indication codes from the field stations to the office. To facilitate understanding of the operation of the equipment the wires forming the control and indication channels are designated in Figs. 1C, 1D, 2D and 2K by the same numbers at both the office and field stations, and the numbers employed for this purpose are a combination of the numbers employed in Figs. 7 and 5 of the Lewis patent to designate the corresponding wires at the office and field stations. For example, in the Lewis patent the first control channel is governed by wire 101 at the office and governs the controlled relay at the field station over wire 31, and in this application the corresponding wires at both the office and field stations are designated 101—31. The other control channels are designated 103—32, 102—34, and 104—35, and the indication channels are designated in Figs. 1C, 1D and 2K by the numbers 109—39, 110—40, 111—41, 113—43, and 115—45.

For simplicity, the code channels are represented herein by direct wire connections, such as would be used for the control and indication of apparatus in the vicinity of the control office, although the coding apparatus establishes the channels only one at a time over a single line circuit, but this may be disregarded and the operation may be more readily traced by assuming that terminals or wires 101—31, 103—32, 102—34 and 104—35 in Figs. 1C and 1D, extend directly to the corresponding wires or terminals in Fig. 2D, and that terminals or wires 109—39, 110—40, 111—41, 113—43 and 115—45 in Fig. 2K extend directly to the corresponding terminals or wires in Figs. 1C and 1D.

Each control code transmitted from the office is initiated by the energization of a starting relay of which one or more is provided in each office storage unit. Each starting relay may be energized by the operation of a starting button in the corresponding panel, and, when energized, prepares a starting circuit to effect the initiation of the corresponding code as described in Patent No. 2,229,249.

As hereinafter explained in detail, the office storage unit employed in the control of the signals 2R, 2L, 6R and 6L is governed by two starting relays which are designated 2RLST and 6RLST, and either of these starting relays is capable of initiating transmission of a code by this unit.

Each control code includes a distinctive code call by which a selector relay, such as relay 234S, Fig. 1C, in the office storage unit, and a delivery relay, such as relay F234D, Fig. 2D, in the corresponding field storage unit, are energized, to establish channels 101—31, 103—32, 102—34 and 104—35 to position a particular group of control relays at the station in accordance with the condition of energization of the control channels as determined by the positions of the levers of the corresponding office panel. The manner in which the various functions have been assigned to the different code steps or channels and to the different panels and storage units will be obvious from a consideration of Figs. 1C, 1D and 2D.

In the code system of Patent No. 2,229,249, the indication codes are initiated by the energization of a normally deenergized starting relay, not shown, in the station storage unit. Each starting relay is energized in response to a change in position of any of the indicating relays which govern the unit, and also when the delivery relay is operated by a control code. A return indication code therefore follows each control code, regardless of whether or not the positions of the controlled devices are changed. Each indication code includes a distinctive code call by which a selector relay, not shown, and a repeating relay, such as relay 234MSP, Fig. 2K, in the station storage unit, and also a delivery relay, such as 234D, Fig. 1C, in the corresponding office storage unit, are energized to establish the indication channels, and thereby effect the selective energization of the indication stick relays 1NWK, 1RWK, etc. of the office unit in accordance with the condition of energization of the channels as reflected by the positions of the indicating relays assigned to the corresponding station storage unit.

At the end of the code a relay VC, not shown, in the station unit is energized, and connects a series of stick relays 10V, 11V, etc., to the corresponding channels, etc., as shown and described in the Lewis patent. The relays V are actuated to their energized or released positions as required to open the circuit for the starting relay, provided the positions of the indicating relays at the station did not change during the transmission of the code and correspond with the positions to which the office indication relays have been operated.

*The circuits and apparatus at the control office*

It is to be understood that the system includes the office coding and storage units of Patent No. 2,229,249 and that these function as described in the patent except for such modifications as are pointed out herein.

As shown in Fig. 1A, the operator's control board includes an illuminated diagram of the track layout and employs four office storage units. One storage unit is assigned to the control of switch 1W and the crossover switches 3AW and 3BW, another to the control of the switch 7W and the crossover switches 5AW and 5BW, the third to the control of signals 2RA, 2RB, 2RC, 2LA, 2LB, 6R, 6LA and 6LB, and the fourth to the control of signal 4R. A signal control lever, preferably of the type incorporating a starting button, is provided for each of the following groups of signals, 2RA, 2RB, and 2RC; 2LA and 2LB; 6LA and 6LB; and for each of the single signals 6R and 4R. Each signal control lever is designated by the reference character SG, with a suitably distinguishing prefix and the starting button for each such lever is shown in Fig. 1H. A control lever is provided for each switch or crossover, and is designated by the reference character SW with a numerical prefix. Starting buttons designated by the reference characters STB with numerical prefixes corresponding to the associated coding unit, are provided for each of the storage units assigned to switch controls.

Each of the coding units assigned to switch controls is provided with a starting relay, Fig. 1E, designated by the reference character ST with the numerical prefix corresponding to the code call of that unit. The coding unit assigned to the control of the signals 2RA, 2RB, 2RC, 2LA, 2LB, 6R, 6NRA, and 6RB is provided with two starting relays, Fig. 1F, designated 2RLST and 6RLST. The other coding unit assigned to the control of signal 4R is provided with a starting relay, Fig. 1F, designated 4RST.

Fig. 1G shows the circuits for the lamps associated with the signal levers 2RSG and 2LSG, and with the switch lever 1SW, and also the circuit for the lamp 1TKE which indicates occupancy of section 1T. It is to be understood that the circuits, not shown, for the remaining indication lamps on the operator's control board are similarly arranged.

The starting buttons associated with the signal levers each control a slow release repeating relay PBR, Fig. 1H, the purpose of which is to provide a larger number of contacts than it is practicable to provide on the starting button. Each relay PBR, when energized momentarily, controls circuits in Fig. 1F to energize the signal clearing starting relay of the coding unit controlling the signal governed by that signal lever. In case the establishment of a route requires a change in the position of one or more of the track switches, the operated relay PBR completes circuits in Fig. 1E, to pick up the starting relays ST which initiate codes for operating the track switches, thereby storing codes for operating the switches as required, in addition to storing a code for clearing the signal for the route, in response to a single operation of the starting button associated with the operated signal lever SG.

Referring to Fig. 1E, the starting relays 234ST and 235ST correspond to those designated 234 and 235 in Figs. 2 and 5 of Patent 2,229,249, and the circuits in Fig. 1E controlled over contacts c of the relays ST correspond to those shown in Fig. 2 of the patent.

The starting relays 2RLST and 6RLST, Fig. 1F, which initiate the transmission of control codes for governing the signals 2L, 2R, 6L and 6R, together correspond to the starting relay 236 of Fig. 2 of the Lewis patent, while the starting relay 4RST, which initiates transmission of control codes for governing the signal 4R, corresponds to the starting relay 237 of Fig. 2 of the Lewis patent. The circuits governed over contacts c of these starting relays correspond to those in Fig. 2 of the patent except for the addition of novel means hereinafter described arranged in accordance with our invention for controlling these circuits to defer transmission of a signal control code until predetermined conditions exist.

It is to be understood that these circuits normally function as described in the patent, namely, when one or more of the contacts c of the starting relays ST are closed and connected to terminal B, and the code line circuit is free, the coding unit becomes energized to initiate the transmission of a control code including selecting elements comprising a code call by which a selector relay, such as relay 234S, at the office is energized, together with a delivery relay F234D at the selected station. The energization of the selector relay 234S prepares a circuit by which the associated starting relay 234ST is released by the code system relay O8 when the code call portion of the control code is fully transmitted.

In accordance with our invention, each of the starting relays governing transmission of a signal control code, such as relay 2RLST, shown in Fig. 1F, governs a repeater relay STP which is picked up when the associated starting relay ST becomes effective to transmit a code for clearing a signal, and then is held energized until an indication code is received from the station storage unit through which indications of the condition of the controlled signal are transmitted to the office. Each relay STP is released by the operation of the delivery relay D of the associated office storage unit, such as the relay 236D, which relay, as shown in Fig. 5 of the patent and in Fig. 1D of the accompanying drawings, also operates the office signal indication relays 2RHK, 2LHK, etc., in accordance with the conditions of the signals and associated signal control relays.

The transmission of control codes for governing the track switches is governed by the switch indication relays of Fig. 1C as well as by the switch control levers, and referring to Figs. 1C and 2K, it will be seen that the relays 1NWK and 1RWK are normal and reverse switch indication relays which reflect the position of the corresponding track switch 1W and of the control and operating relays 1WR and 1WZ therefor. Each normal or reverse switch indication relay is adapted to be picked up by code over the associated indication channel, and is held energized locally after the termination of the code by a stick circuit extending from terminal B at its front contact a, over a back contact of the delivery relay, and through the relay winding to terminal C at contact b or d of the associated switch lever, such as lever 1SW, provided the lever position corresponds with the indicated position of the switch. If the switch lever is moved to its opposite position, the circuit for the energized indication relay is extended to include back contact d or e of the associated code starting relay, such as relay 234ST, so that when the starting relay is operated to initiate a code for changing the position of the switch, the energized indication relay is released to cancel the switch indication. Thus the normal indication relay NWK is released by a "switch reverse" control code, and the reverse indication relay RWK by a "switch normal" control code.

This control of the transmission of the control codes for track switches is explained in detail in application Serial No. 649,598 of Arthur L. Jerome, Lloyd V. Lewis and Frank T. Pascoe, wherein it is pointed out that when a starting relay is picked up, the connection to terminal C of each of the indication relays for the switches governed by that starting relay is governed by front contacts of the route check relays RGS or LGS of Fig. 1B, by means of which the energized indication relays for the switches of a route are held energized over the front contacts d or e of the starting relays 234ST, etc., while control codes are stored for transmission or are being transmitted. These circuits serve to prevent the release of the switch indication relays if an attempt is made to operate any switch included in an established route when the route check relay RGS or LGS for the signal governing traffic movements over such route is energized.

In Fig. 1C, back contacts c of the switch indication relays are included in the circuits over which the switch control channels 101—31, 102—34, 103—32, and 104—35 are energized in accordance with the positions of the contacts a of the switch levers, so that cancellation of the switch indication is necessary in order to render the switch control elements of a code effective to change the position of the switch control relay WSR, Fig. 2D, which such elements govern. Otherwise both channels for governing a switch control relay are deenergized in a code transmitted when a switch lever and its control relay WSR occupy dissimilar positions, and relay WSR is not operated.

Referring now to Fig. 1B, it will be seen that front contacts b and d of the switch indication relays together with contacts of the switch levers are so interconnected that when closed they form route circuits, there being one such circuit conforming to each route through the track layout of Fig. 2A. It will also be seen that when any signal lever, such as lever 2RSG, is operated to its reverse position, with a route circuit established, the corresponding route check relay 2RGS is connected to the route circuit over the signal lever contact e or f and becomes energized and in turn holds energized the switch indication relays for the switches of the corresponding route. It follows that the energization of a control channel to operate a track switch away from its existing position is possible only when the route check relay for each route over the switch is released.

Visual indications of the condition of the switch indication relays are provided in the control board of Fig. 1A by lamps such as 1NE and 1RE mounted above the switch levers and energized over contacts *e* of the indication relays as shown in Fig. 1G.

Considering now the remaining indication relays of Fig. 1D, the relays 1TK, 3TK, etc. are track indication relays controlled through station 237 to light red lamps 1TKE, etc., in the track diagram, to indicate when the corresponding track sections are occupied, the lamp circuits being shown in Fig. 1G. Storage of the detector section indications is provided, and when, for example, the track relay 1TR of Fig. 2K releases, an indication of occupancy of the section is stored by relay 1TS, as described in Patent No. 2,229,249.

It has already been explained that code elements effective to operate a track switch are transmitted only when each route check relay, such as relay 2RGS or 2LGS of Fig. 1B, which governs a route over the switch, is in its released position, and that each such route check relay becomes energized in response to the reversal of the associated signal lever 2RSG or 2LSG, provided a route circuit is established in Fig. 1B, for a route governed by a signal which such lever controls. If the route check relay becomes energized, a signal clearing code may be initiated by operating the associated starting button, or as hereinafter explained, is automatically initiated in accordance with our invention upon picking up of the route relay if the starting button had previously been operated to pick up the signal starting relay. When a route check relay picks up and the associated starting relay is picked up, a repeater relay STP (Fig. 1F) is energized and this repeater relay STP then disconnects the energized route check relay from the route circuit but holds it energized over a stick circuit, as shown in Fig. 1B.

When signal lever 2RSG is moved to the right and the control code to clear signal 2R is transmitted, wire 102—34 is connected to terminal B as shown in Fig. 1D, over the right-hand contact *a* of lever 2RSG, back contact *a* of a relay 1TKA, previously described, and front contact *d* of relay 2RGS, causing the signal control relay 2RHS of Fig. 2D to pick up. This code is of course transmitted only after the route relay in the office indicates that a route is available at the station, and consequently when relay 2RHS picks up, it completes a circuit for relay 2RH (Fig. 2B) which picks up to close its contacts *a* and *e*, to prepare the circuit (Fig. 2C) for the group of signal mechanisms 2RAG, 2RBG or 2RCG. Relay 2RH also opens its contact *b* in the circuit (Fig. 2G) for relay 2RAS, and the latter relay releases to open the circuits for relay 1ES (Fig. 2H) and relay 1—3LR (Fig. 2J). With relay 2RH picked up and relays 2RAS and 1—3LR released, the circuit network is completed over which the proper signal mechanism 2RAG, 2RBG or 2RCG, as selected by relays 2RHD and 1RWP (Fig. 2C) is supplied with energy over a circuit path determined by the route set up and hereinbefore described in detail.

As previously mentioned, the receipt of a code by unit 236 at the station initiates transmission of an indication code in the manner pointed out in the Lewis patent, and this code finds contact *e* of relay 2RHS closed (Fig. 2K) so that energy may be placed on the terminal 111—41. At the office relay 2RHK picks up (Fig. 1D) and closes its contact *a* in the circuit (Fig. 1B) of relay 2RGS to maintain that relay energized over its stick circuit after relay 2RLSTP releases. Relay 2LHK may also pick up at the office at this time, depending upon whether terminal 109—39 at the station is energized or not, and it follows that if relay 2RHS picks up, its front contact *e*, Fig. 2K, establishes circuits for controlling the channels 109—39 and 111—41 so that the return indication code is certain to indicate either the clear or the approach locked condition of the signal by energizing relay 2RHK alone or along with relay 2LHK.

The approach locking relay 2RAS also controls a circuit over its front contact *e* (Fig. 2K) for supplying energy to channel 111—41 over which relay 2RHK is controlled so that after release of relay 2RHS the indication codes transmitted to the office maintain the relay 2RHK picked up as long as the relay 2RAS is released.

It will be seen, therefore, that after a signal clearing code for energizing a signal control relay, such as 2RHS, has been stored for transmission, the route check relay 2RGS is locked energized, and can be released only after an indication code has been received which indicates that relay 2RHS has been released and the approach locking relay 2RAS is picked up. The route check relay 2RGS, when energized, maintains the route circuit established by reason of its control of the stick circuits for the switch indication relays in Fig. 1C, to prevent a change in route, and is releasable only when it is proper to change the route, since the code which indicates that the signal control relay 2RHS is released must also indicate that the signals such relay controls are at stop and that their approach locking relay 2RAS is energized before the relay 2RHK is released to interrupt the stick circuit for relay 2RGS.

Assuming that relay 2RHS has been picked up by the energization of channel 102—34, to clear one of the signals which relay 2RHS controls, for an approaching train, if lever 2RSG is not moved from its right-hand position, channel 102—34 will be energized over the previously traced circuit including contact *a* of lever 2RSG in its right-hand position (Fig. 1D) in each succeeding code transmitted by the same unit prior to the time the train enters section 1T, thereby maintaining relay 2RHS picked up to hold the signal at clear until the train passes it.

Under the conditions assumed i. e. with one of the signals controlled by relay 2RHS cleared, when the train enters section 1T, relay 1TR releases to initiate the transmission of a track occupied indication code, as already described, while relay 1TS is picked up to store the occupied indication if the section should become vacated before that indication is transmitted to the office. When relay 1TR releases, its contact *b*, Fig. 2K, interrupts the circuit of the slow release repeater relay 1TP and after a short time interval relay 1TP releases so that its back contact *a* in the circuit of relay 2RHS (Fig. 2D) is closed and so that front contact *b* of relay 1TP in the pick-up circuit of relay 1TSA (Fig. 2K) is open. In the period after release of the relay 1TR and prior to release of the relay 1TP, the circuit of relay 2RHS is interrupted and it releases to interrupt its stick circuit so that it remains released after back contact *a* of relay 1TP closes. In addition, in the period after release of relay 1TR and prior to release of relay 1TP energy is supplied to relay 1TSA over its pick-up circuit which includes back contact $h$ of relay ITR and front contact $b$ of relay ITP. The relay ITSA therefore picks up and establishes its stick circuit which is governed by relays ITS and IOV and maintains the relay ITSA energized until an occupied indication code is transmitted to the office, whereupon relay IOV picks up and interrupts the stick circuit for relay ITSA and it releases. When relay ITSA picks up, its contact $b$, Fig. 2D, interrupts the circuit of relay 2RHS to prevent its response to a control code until an indication code has been transmitted to the office.

When the indication code including the track occupied indication is transmitted, relay ITK at the office becomes energized to light lamp ITKE (Fig. 1G). When relay ITK is first energized, a circuit is closed momentarily from channel 110—40, Fig. 1D, over back contact $b$ of relay ITK and front contact $g$ of relay 2RGS through the upper winding of relay 1—1TKA to terminal C. Relay 1—1TKA, therefore, picks up and establishes a stick circuit including its front contact $a$ and contact $a$ of lever 2RSG in its right-hand position and relay 1—1TKA remains energized until lever 2RSG is restored to normal. Relay ITSA is released upon the transmission of the track occupied code, rendering relay 2RHS responsive to control codes in which channel 102—34 is energized. It follows that the energization of a signal control channel in a transmitted code cannot occur inadvertently, due to a failure of the operator to return the signal lever to normal after the signal it controls has been put to stop by a train.

Operation

The operation of the system of our invention under different assumed conditions will now be described, starting with the apparatus in the condition shown in the drawings, with all switches normal, all signals at stop, and the detector track sections unoccupied.

Starting with this apparatus in its normal condition, as shown, it will be first assumed that the operator reverses the switch lever 3SW to reverse the crossover switches 3AW—3BW, and that he then moves the signal lever 2RSG to the right and presses the associated starting button to clear signal 2RB, for a train movement over that route.

The operation of the starting button associated with lever 2RSG energizes the relay 2RPBR, Fig. 1H, thereby energizing relay 234ST over the circuit shown in Fig. 1E and including front contact $a$ of relay 2RPBR, reverse contact $c$ of lever 3SW, back contact $f$ of relay 3RWK, and a back contact of starting button 234STB, to initiate the transmission of a control code to station 234 to operate crossover switches 3AW—3BW. The opening of back contact $e$ of relay 234ST, Fig. 1C, releases relay 3NWK and by the resulting code, relay 234S, Fig. 1C, is energized to connect terminal B over back contact $c$ of relay 3TK and back contact $d$ of relay ITK at contact $d$ of relay 234S over the reverse contact $a$ of the switch lever 3SW and back contact $c$ of relay 3NWK to channel 104—35, and in Fig. 2D, the delivery relay F234D is energized to extend channel 104—35 over contact $d$ of relay F234D through the lower winding of relay 3WSR to terminal C over front contacts $e$ of the switch locking relays 1—3LR and 3LR and back contacts $c$ of the track storage relays ITS and 3TS provided the proper traffic conditions prevail as manifested by the energization of these locking relays and release of the track storage relays.

It will be seen that when switch lever 3SW is reversed, its contact $h$ opens the route circuit in Fig. 1B for the existing route from signal 2R to 2L, while this circuit is additionally interrupted on release of contact $d$ of relay 3NWK, and that the operation of the interlocked circuits of Figs. 1B and 1C is such as to require the switch and signal levers and starting buttons to be operated in the sequence recited above. Thus if signal lever 2RSG is reversed and the associated starting button is pressed before the switch lever 3SW is reversed, relay 2RGS, Fig. 1B, will be energized over the route circuit extending to terminal B at back contact $a$ of relay 2LGS, while the relay 2RLSTP (Fig. 1F) will be energized and its contact $a$ will remove relay 2RGS from the network and will establish a stick circuit to maintain relay 2RGS energized. If, after picking up of relay 2RGS, the operator should then press button 234STB after reversing lever 3SW, the energization of relay 234ST would complete a circuit in Fig. 3C from the left-hand terminal of the winding of relay 3NWK, over contact $b$ of lever 3SW, front contact $e$ of relay 234ST, over back contacts $e$ of relays 4RGS, 6LGS and 2LGS, to terminal C at front contact $e$ of relay 2RGS, holding relay 3NWK energized to maintain channel 104—35 deenergized in the transmitted code, so that relay 3WSR would not be operated to reverse.

The operator, however, may move lever 2RSG to the right after lever 3SW is reversed or relay 3NWK releases, but relay 2RGS will remain released until the new route is established and indicated. During this period channel 102—34, Fig. 1D, is disconnected from contact $a$ of lever 2RSG by the open contact $d$ of relay 2RGS, and relay 2RHS would remain released in the event a control code should be transmitted from office storage unit 236.

Since relay INWK is held energized over the normal contact $b$ of lever ISW, it does not release when relay 234ST picks up. It follows that the operator is free to initiate a control code by operating relay 234ST to control any appropriate function over any of the idle channels in this storage unit, and that this function may be governed independently of the switch levers assigned to the same unit.

When lever 2RSG is reversed and the associated starting button is pressed to pick up relay 2RPBR, contact $b$ of relay 2RPBR, Fig. 1F, establishes a pick-up circuit for relay 2RLST and its contacts pick up to establish a stick circuit for the relay. In addition, when relay 2RLST picks up, its contacts $c$ and $d$ prepare circuits for the relays OM and 2RLSTP, but these circuits are not complete until relay 2RGS picks up. As the circuit of relay OM is not complete on picking up of relay 2RLST, the relay 2RLST is ineffective at this time to control relay OM to initiate operation of the office coding unit to transmit a control code.

As is shown in Fig. 1G, when relay 2RLST picks up with lever 2RSG reversed, energy is supplied over contact $b$ of relay 2RLST to lamp 2RE through a resistor so this lamp is lighted dimly. At this time lamp 2NRE continues to be lighted over the circuit including back contact $c$ of relay 2RHK and the dim lighting of lamp 2RE along with the lighting of lamp 2NRE provides a distinctive indication of the fact that a control for clearing signal 2R has been initiated, but that the route governed by this signal is incomplete.

As long as relay 236S is released, the stick circuit for relay 2RLST is complete over back contact *a* of relay 236S. The relay 236S may be picked up as a result of transmission of a control code to station 236 for a purpose other than to clear signal 2R, or it may be picked up as a result of receipt of an indication code from the corresponding station. If relay 236S should pick up prior to picking up of relay 2RLSTP, the stick circuit for relay 2RLST is established over back contact *d* of relay 2RLSTP and contacts *b* and *d* of the levers 2LSG and 2RSG. The stick circuit provided over front contact *a* of relay 236S and back contact *d* of relay 2RLSTP for relay 2RLST prevents premature release of this relay and insures that it remains picked up to store the control code until relay 2RGS picks up to show that the route is complete.

Assuming now that relay 3WSR (Fig. 2D) has been reversed by the proper manipulation as hereinbefore described, the normal switch repeating relay 3NWP, Fig. 2F, is released by relay 3WSR and relays 3A—WZ and 3B—WZ assume their reverse positions in which the motors of the switch machines are energized over circuits similar to that shown for switch machine ISM, in Fig. 2E, to operate the crossover switches 3AW—3BW to reverse.

The operation of the delivery relay F234D by this code also energizes the station starting relay, not shown, as explained in the Lewis patent, thereby initiating the transmission of a return indication code which indicates the transit or open condition of the crossover switches, channels 113—43 and 115—45 being deenergized to maintain relays 3NWK and 3RWK released.

When switches 3AW—3BW are operated and locked reverse, relay 3RWP becomes energized as shown in Fig. 2F, and initiates an indication code through station 234 in which channel 115—45 is supplied with current over contact *d* of relay 3RWP, Fig. 2K, thereby energizing relay 3RWK, Fig. 1C, over the reverse contact *d* of lever 3SW, while the closing of contact *b* of relay 3RWK, in Fig. 1B, completes route circuits over which relay 2RGS is energized. Assuming that lever 2RSG remains in its right-hand position, relay 2RGS becomes energized over the circuit from terminal B at back contact *b* of relay 2LGS or at front contact *k* of relay 5NWK, back contact *b* of relay 6LGS, contact *e* of lever 2RCG, reverse contact *e* of lever 3SW, front contact *b* of relay 3RWK, normal contact *e* of lever ISW, front contact *b* of relay INWK, contact *f* of lever 2RSG, and back contacts *a* of relays 2RLSTP and 2RHK through relay 2RGS to terminal C.

As hereinafter explained, picking up of route check relay 2RGS completes the pick-up circuit for relay 2RLSTP and it picks up. As a result, as will be seen from Fig. 1G, when relay 2RGS picks up its contact *f* establishes a circuit including front contact *e* of relay 2RLSTP for supplying energy of full voltage to the lamp 2RE so the lighting of this lamp is changed from dim to normal brilliance. This change in the lamp 2RE, accompanied by the continued lighting of lamp 2NRE, provides a distinctive indication of the fact that the designated route is complete and that a control code for clearing signal 2R will be transmitted.

The apparatus of our invention is arranged so that the code for clearing the signal is transmitted automatically following the last of the indication codes by which the route circuit is established, provided the signal lever is reversed. When relay 2RGS picks up, showing that the route is complete, energy is supplied to the upper or pick-up winding of relay 2RLSTP over the circuit shown in Fig. 1F. This circuit includes contact *c* of signal lever 2RSG, front contact *h* of relay 2RGS, and front contact *d* of relay 2RLST. When relay 2RLSTP picks up, its contact *c* establishes a stick circuit including back contact *e* of relay 236D for supplying energy to the lower or holding winding of relay 2RLSTP to keep the relay picked up until an indication code is received from station 236, as is manifested by picking up of relay 236D.

In addition, as shown in Fig. 1B, when relay 2RLSTP picks up, its back contact *a* opens to remove relay 2RGS from the network. Relay 2RGS is proportioned to hold up during the transit time of contact *a* of relay 2RLSTP from its back to its front position, and when front contact *a* of relay 2RLSTP closes it establishes a stick circuit to keep relay 2RGS energized.

Referring again to Fig. 1F it will be seen that when relay 2RGS picks up with lever 2RSG reversed, lever 2LSG normal, and relay 2RLST picked up, energy may be supplied to relay OM and this relay will cause the office coding unit to transmit a control code to station 236, as explained in the Lewis patent. During transmission of the code to station 236, the selector relay 236S at the office is picked up and, as shown in Fig. 1D, terminal B of the source is connected over contact *a* of lever 2RSG, back contact *a* of relay 1—1TKA, front contact *d* of relay 2RGS, and front contact *f* of relay 236S to channel 102—34, and the code sent at this time is effective to pick up relay 2RHS, Fig. 2D.

As is shown in Fig. 1F, when relay 236S picks up, its contact *a* transfers the stick circuit for relay 2RLST to the circuit governed by contact *d* of relay 2RLSTP. At this time relay 2RLSTP is picked up so the stick circuit for relay 2RLST is connected to the wire leading to back contacts of the relays OM and O8. As explained in the Lewis patent, the relay OM is picked up during transmission of a control code and the relay O8 is picked up during the eighth or final station selection step of the code. Accordingly, when relay 2RLST is picked up and lever 2RSG is reversed, the relay 2RLST remains picked up until a control code is transmitted to the associated station, whereupon the relay 2RLST releases to interrupt its own stick circuit and to interrupt the pick-up circuits for relays OM and 2RLSTP. In addition, as is apparent from Fig. 1G, when relay 2RLST releases, its contact *b* interrupts the circuit for supplying energy to lamp 2RE through the resistor, but at this time energy is supplied to lamp 2RE over the circuit established by front contact *f* of relay 2RGS so there is no change in the indications displayed on the panel when relay 2RLST releases.

When relay 236S picks up during the transmission of the control code for clearing signal 2R, contacts *d* and *e* of relay 236S, Fig. 1D, in the circuits governed by levers 6RSG and 6LSG for energizing channels 101—31 and 103—32 are closed. However, as relays 6RGS and 6LGS are both released, and as the levers 6RSG and 6LSG are both in their normal positions, energy is not supplied to either of these channels when relay 236S picks up and the control code sent to station 236 will not pick up relay 6RHS or relay 6LHS.

When route check relay 2RGS picks up, its contact e, Fig. 1C, establishes connection from terminal C to the wire leading to front contact d of relay 234ST. Accordingly, if after relay 2RGS picks up, the lever 1SW is reversed and the starting relay 234ST is picked up to initiate a control code, the relay 1NWK will not release and its contact c will prevent the supply of energy to channel 103—32 so the control code which is transmitted will not reverse relay 1WSR, Fig. 2D.

It will be seen, therefore, that positioning of the switch and signal levers and operation of the starting button associated with the signal lever initiates transmission of codes for establishing the route designated by the levers. If establishment of the route requires movement of one or more switches, the signal control code is not transmitted at once, but is stored by a relay such as relay 2RLST, until indications are received that the switches occupy the positions in which they establish the designated route. When indications are received that the route is complete, the route check relay, such as relay 2RGS, picks up and automatically initiates transmission of the signal clearing control code, while picking up of the route check relay energizes a repeater relay, such as relay 2RLSTP, which prevents interference with the route by subsequent operation of any of the switch levers.

Prior to picking up of the route check relay, however, the operator is free to change or alter the route by moving the switch levers. If a change is made, the route check relay will not pick up until the route established in the field and indicated in the office corresponds with that designated by the switch levers.

Assuming that no change is made in the route and that a control code for clearing signal 2R is transmitted as explained above, the delivery relay F236D, Fig. 2D, picks up at the end of the control code and connects relay 2RHS to channel 102—34. This channel is energized at this time because of energization of the corresponding channel at the office during the picked-up period of the relay 236S. Accordingly, relay 2RHS picks up, and after relay F236D releases, the relay 2RHS is held energized over a stick circuit including its contact a and back contact b of relay 2LHS and extending to terminal B at back contact f of relay F236D.

In Fig. 2B, relay 2RHS energizes the route relay 2RH over the circuit from terminal B at front contact d of relay 2RHS, over contacts a of relays 3RWP and 1NWP, and front contact c of relay 2RHS through relay 2RH to terminal C.

In Fig. 2C contacts a and c of relay 2RH close to prepare a circuit hereinafter traced, for mechanism 2RBG, and in Fig. 2G the approach locking relay 2RAS is released by the opening of back contact b of relay 2RH.

In Fig. 2H the opening of contact c of relay 2RAS releases relay 1ES, and in Fig. 2J the opening of contact d of relay 2RAS releases the switch locking relay 1—3LR, and the opening of contact b of relay 1ES releases relay 3LR. The relay 1—3LR then opens its front contacts a to e in the circuits for the relays WSR and WZ in Figs. 2D and 2E to lock each of the switches of the route, and since in Fig. 2C back contact b of relay 2RAS is now closed, the closing of back contacts f of the switch locking relays LR completes the circuit for mechanism 2RBG which extends from terminal B at front contact e of relay 6LAS, over front contact e of relay 2LAS and front contact h of relay 5NWP in parallel, back contact f of relay 3LR, front contacts c of relays 3RWP and 1NWP, back contact f of relay 1—3LR, back contacts b of relays 2RAS and 2RTE, and thence over contacts a and c of relay 2RH, contacts b of relays 1NWP and 1RWP and back contact a of the polarized line relay 2RHD through mechanism 2RBG to terminal C. Relay 2RHD is deenergized at this time since crossover 3AW—3BW is reversed so that contact g of relay 3NWP is open in the circuit of relay 2RHD (Fig. 2C). Mechanism 2RBG therefore becomes energized to cause signal 2RB to indicate caution and to release relay 2RGP, which relay opens its contact b in the circuit for relay 2RAS, and also initiates the transmission of an indication code from station 236 by which the signal indication relay 2RHK is energized as indicated in Fig. 2K.

As pointed out above, when relay 2RHS is picked up to clear a signal 2R, front contact e of relay 2RHS, Fig. 2K, establishes a circuit over which energy is supplied to channel 111—41 to control relay 2RHK at the office. Accordingly, the first indication code transmitted to the office following receipt of the control code by which relay 2RHS is picked up is certain to pick up relay 2RHK.

Furthermore, as explained above, when relay 2RH picks up, the relay 2RAS releases and contact e of relay 2RAS establishes a circuit over which energy is supplied to channel 111—41 during transmission of an indication code to station 236 at the office. The relay 2RH normally picks up promptly after the picking up of relay 2RHS so that relay 2RAS is promptly released and contact e of relay 2RAS establishes the circuit for supplying energy to channel 111—41 before an indication code can be transmitted to the office. However, as front contact e of relay 2RHS establishes a circuit for energizing channel 111—41, the indication code sent to the office after picking up of relay 2RHS is certain to pick up relay 2RHK even though there is some delay in release of relay 2RAS so that relay 2RAS does not release until after the first indication code is transmitted from station 236 to the office.

When contact e of relay 2RHS is picked up or contact e of relay 2RAS is released, energy may also be supplied to channel 109—39 over which relay 2LHK at the office is controlled. However, on clearing of a signal 2R, and consequent release of relay 2RGP, its contact a opens the circuit for supplying energy to channel 109—39 and the indication code sent from station 236 to the office will not pick up relay 2LHK.

When the indication code is transmitted from the field to the office through station 236 following the clearing of signal 2RB, the relay 236D picks up at the end of the indication code and connects relay 2RHK, Fig. 1D, to channel 111—41 so that relay 2RHK picks up. In addition, when relay 236D picks up, its contact e, Fig. 1F, interrupts the circuit of the lower or holding winding of relay 2RLSTP and it releases so that its contact a, Fig. 1B, in the stick circuit for relay 2RGS is open. However, before relay 2RLSTP releases to open the stick circuit for relay 2RGS, the relay 2RHK picks up so that its contact a establishes the stick circuit for relay 2RGS, as shown in Fig. 1B. Accordingly, the route check relay 2RGS is certain to remain picked up to prevent energization of a route check relay for a conflicting route and to prevent transmission of a code to move a switch in the route. In addition, as relay 2RGS remains picked up, its contact d, Fig. 1D, in the circuit for energizing channel 102—34 is closed and, as long as lever 2RSG is reversed and relay 1—7TKA is released, control codes transmitted to station 236 will include an element to keep relay 2RHS picked up.

Referring to Fig. 1G it will be seen that when relay 2RHK picks up, its contact c interrupts the circuit of the lamp 2NRE and establishes a circuit to maintain lamp 2RE lighted after release of relay 2RLSTP. When the lamp 2NRE is extinguished and the lamp 2RE remains lighted, the operator knows that the signal 2R has cleared in response to the control code.

If the indication code transmitted from station 236 after picking up of relay 2RHS is transmitted before signal 2RB clears, and thus before relay 2RGP releases, energy will be supplied over front contact a of relay 2RGP to channel 109—39 and the indication code sent to the office will pick up relay 2LHK. Under these conditions, contact d of relay 2LHK will interrupt the circuit of lamp 2RE, and as the circuit of lamp 2NRE is interrupted by contact c of relay 2RHK, it follows that both of the lamps over lever 2RSG are extinguished and provide a distinctive indication of the fact that a control code for clearing the signal has been received, but that the signal has not cleared.

As relay 2RHK is picked up, its contact a establishes a stick circuit for relay 2RGS to prevent its release after release of relay 2RLSTP which occurs on receipt of the indication code.

When relays 2RHK and 2LHK are both picked up, the circuits of lamps 2LE and 2LNE associated with lever 2LSG are both extinguished.

If signal 2RB subsequently clears, the relay 2RGP will release and its contact a will interrupt the circuit for supplying energy to channel 109—39, while the C. T. C. equipment will be actuated to transmit an indication code to the office. As channel 109—39 is deenergized, relay 2LHK will be released, but relay 2RHK will remain energized since at the field station energy continues to be supplied to channel 111—41. On release of relay 2LHK the circuits of lamps 2LNE and 2RE are established and the lamps on the panel of the office control machine show that signal 2R has cleared.

As relay 2RHK remains picked up, it maintains the stick circuit for relay 2RGS and insures that it remains picked up to maintain the route.

When a train accepts the signal 2R and enters section 1T, the relay 1TR releases and its contact a, Fig. 2D, interrupts the stick circuit for relay 2RHS and it releases to additionally interrupt its stick circuit while contacts d and c of relay 2RHS, Fig. 2B, interrupt the circuit of relay 2RH. Accordingly, relay 2RH releases and its contacts a and c, Fig. 2C, interrupt the circuit of the winding of signal 2RBG and it goes to stop so a contact of the signal mechanism completes the circuit of relay 2RGP.

With relay 2RH released, relay 2RGP picked up and relay 1TR released, pick-up circuit is established for relay 2RAS, Fig. 2G, and it picks up to open its back contact b (Fig. 1C) to additionally interrupt the circuit of signal 2RBG. When relay 2RAS picks up, its contacts in the circuits of relays 1—3LR and 1ES are closed but these relays remain released as their circuits are interrupted by contacts of relay 1TR. As relay 1ES is released, its contact b continues to interrupt the circuit of relay 3LR, and as relays 1—3LR and 3LR remain released the switch 1W and the crossover switches 3AW and 3BW continue to be locked.

When relay 2RAS picks up, its contact e, Fig. 2K, interrupts one circuit for supplying energy to channels 109—39 and 111—41, while on release of relay 2RHS its contact e interrupts the other circuit for supplying energy to these channels during transmission of an indication code from station 236.

When relay 1TR releases, its contact b, Fig. 2K, establishes the pick-up circuit for relay 1TS and it picks up to establish a stick circuit to keep itself energized until relay 1TR is picked up and an indication code is sent to the office.

In addition, as long as energy is supplied to relay 1TS over either its pick-up or its stick circuit, energy is also supplied to channel 110—40 during transmission of indication codes from station 237.

When relay 1TR releases, its contact b interrupts the circuit of slow release relay 1TP, Fig. 2K, while contact h of relay 1TR establishes the circuit for supplying energy to relay 1TSA in the period prior to release of relay 1TP. Accordingly, relay 1TSA picks up and establishes its stick circuit which includes a back contact of relay 10V and a front contact of relay 1TS. When relay 1TSA picks up, its contact b, Fig. 2D, interrupts the circuit of relay 2RHS to prevent its response to a control code after release of relay 1TP and closure of its contact a in the circuit of relay 2RHS. When the first indication code is sent to the office, the relay 10V picks up in the manner explained in the Lewis patent, and interrupts the stick circuit for relay 1TSA and it releases to additionally interrupt its stick circuit and to close its back contact b, Fig. 2D, to permit response of relay 2RHS to a control code.

As a result of the picking up of relays 2RGP and 2RAS, the field station 236 is caused to send a code to the office, and as a result of the release of relay 1TR the field station 237 is caused to send a code to the office.

When the indication code is sent from station 236 to the office, the relay 2RHK, Fig. 1D, at the office releases, and its contact c, Fig. 1G, opens the circuit of the lamp 2RE and establishes the circuit of the lamp 2RNE and this change in the lamps above the lever 2RSG informs the operator that the signal has been put to stop.

Referring to Fig. 1B, it will be seen that on release of relay 2RHK its contact a interrupts the stick circuit for the relay 2RGS and connects this relay to the network. If the signal lever 2RSG remains reversed and the switch levers have not been moved, the relay 2RGS will be energized by current supplied over the network after release of relay 2RHK. However, the relay 2RGS will release as soon as the lever 2RSG is restored to its normal center position. If relay 2RGS remains picked up after release of relay 2RHK, energy will not be supplied over front contact f of relay 2RGS to lamp 2RE since this circuit is interrupted by contact e of relay 2RLSTP. Likewise, if lever 2RSG remains reversed, energy will not be supplied over its contact g to lamp 2RE as this circuit is interrupted by contact b of relay 2RLST. Accordingly, the signal indication lamps provide a distinctive indication when the signal is returned to stop.

When the indication code is transmitted from station 237 to the office, the relay 1TK, Fig. 1D, picks up, and one of its contacts establishes the circuit of the lamp 1TKE, Fig. 1G, and it is lighted to indicate occupancy of the corresponding section. In addition, when relay 1TK picks up, its contacts c and d, Fig. 1C, interrupt the circuits governing the supply of energy to the channels governing control codes for operating switch control relays 1WSR and 3WSR. Accordingly, as long as relay 1TK is picked up, control codes for changing the positions of switches 1W and 3W cannot be transmitted.

When the indication code for picking up relay 1TK is received at the office, energy is supplied to the relay 1—1TKA, Fig. 1D, in the interval prior to the picking up of relay 1TK and the relay 1—1TKA picks up to establish a stick circuit to keep itself picked up until lever 2RSG is returned to its normal position. When relay 1—1TKA picks up, its contact a interrupts the circuit for energizing channel 102—34 to prevent transmission of a control code for clearing signal 2R until lever 2RSG is restored to normal to release relay 1—1TKA and is thereafter reversed.

Referring to Figs. 2D and 2K it will be seen that as soon as the indication code showing occupancy of section 1T is transmitted to the office the relay 1TSA is released and the relay 2RHS may respond to a control code if the operator wishes to reclear the signal for a following train.

When the train under consideration proceeds far enough across the crossover switches 3BW—3AW to enter section 3T, the track relay 3TR releases and its contact b, Fig. 2K, establishes the pick-up circuit for relay 3TS and also establishes a connection for supplying energy to channel 111—41 during transmission of an indication code from station 237. In addition, on release of relay 3TR, the relay 3TSA picks up and the relay 3TP releases. Release of relay 3TR initiates transmission of an indication code from station 237 if on release of relay 3TR the code for reporting occupancy of section 1T has been transmitted, but if at the time relay 3TR releases the code for indicating occupancy of section 3T has not been transmitted, the indication code sent from station 237 will contain elements to show occupancy of sections 1T and 3T.

When the indication code is received at the office following release of relay 3TR, the relay 3TK, Fig. 1D, picks up and establishes a circuit for lighting the lamp 3TKE to show occupancy of the corresponding track section. On the supply of energy to relay 3TK energy is not supplied to relay 3TKA as the route check relay 4RGS is released and its contact g in the circuit of the pick-up winding of relay 3TKA is open so relay 3TKA remains released.

When relay 3TK picks up, its contact c, Fig. 1C, interrupts the circuits governed by relay 234S for supplying energy to channels 102—34 and 104—35 to thereby prevent transmission of a control code to operate relay 3WSR as long as relay 3TK is picked up.

The signal 6R may be cleared to authorize further movement of the train through the track layout. The operation of the equipment on clearing of signal 6R, and on movement of the train past the signal, is substantially the same as on clearing of signal 2R and acceptance thereof by the train, and a detailed explanation of the operation of the equipment at such times is unnecessary.

As long as section 1T is occupied, the relay 1TR remains released and interrupts the circuits of relay 1ES, Fig. 2H, and of relay 1—3LR, and as relay 1ES is released it interrupts the circuit of relay 3LR, while the circuit of relay 3LR is additionally interrupted by a contact of relay 3TR as long as section 3T is occupied. Hence relays 1—3LR and 3LR remain released and open the circuits of switch control relays 1WSR and 3WSR, Fig. 2D, and of the switch control relays 1WZ and 3A—WZ and 3B—WZ of Fig. 2E.

Similarly, as long as sections 1T and 3T are occupied, the track relays 1TR and 3TR maintain the circuits of relays 1TS and 3TS and these relays remain picked up and interrupt the circuits of the switch control relays 1WSR and 3WSR. In addition, as long as relays 1TR and 3TR are released, their contacts b maintain the circuits for energizing channels 110—40 and 111—41 during transmission of indication codes through station 237 to the office so the relays 1TK and 3TK at the office remain picked up to maintain the circuits of the lamps 1TKE and 3TKE and to prevent transmission of control codes for operating the switch control relays 1WSR and 3WSR.

As explained in the Lewis patent, the relays 10V and 11V are picked up during transmission of an indication code to the office at a time during which the associated indication channel is energized, and each thereafter remains picked up until an indication code is transmitted to the office at a time when the associated channel is deenergized. When relays 10V and 11V pick up, they interrupt the stick circuits of the associated track stick relays TS but these remain picked up by energy supplied over their pick-up circuits as long as the associated track relays are released.

When section 1T is vacated, relay 1TR picks up and interrupts the pick-up circuit for relay 1TS and, assuming that relay 10V has become picked up, relay 1TS releases to interrupt its stick circuit, and transmission of an indication code to the office is initiated. When this indication code is transmitted, energy is not supplied to channel 110—40 so the relay 1TK at the office is released.

Similarly, when section 3T is vacated, the relay 3TR picks up and releases relay 3TS and initiates transmission of an indication code to the office if the code initiated on picking up of relay 1TR has been transmitted. The indication code transmitted after picking up of relay 3TR releases relay 3TK at the office as channel 111—41 is deenergized.

Release of relays 1TK and 3TK at the office extinguishes the lamps 1TKE and 3TKE to show that the corresponding sections have been vacated. In addition, release of relays 1TK and 3TK permits energy to be supplied to the control code channels over which relays 1WSR and 3WSR are controlled so these relays may be operated if desired.

At the field station, picking up of relay 1TR completes the circuit of relay 1ES, Fig. 2H, and also completes the circuit of relay 1—3LR, Fig. 2J. When relay 1ES picks up, its contact b in the circuit of relay 3LR is closed so that relay 3LR will pick up when relay 3TR picks up.

On release of relays 1TS and 3TS their contacts c in the circuits of the switch control relays 1WSR and 3WSR are closed. The relay 1—3LR picks up when section 1T is vacated so the circuit of relay 1WSR is complete at this time and this relay can respond to a control code. The relay 3LR picks up when section 3T is vacated so the circuit of relay 3WSR is complete and this relay can respond to a control code.

Operation of equipment to clear signals for different routes

As explained above, the signals 2R, 2L, 6R and 6L are controlled through field station 236. Traffic conditions may be such that the operator may wish to clear two of these signals to authorize train movements over non-conflicting routes. For example, one of the signals 2R may be cleared to direct a train along the lower main track, while one of the signals 6L may be cleared to direct a train moving in the opposite direction along the upper main track. If the crossovers 3AW—3BW and 5AW—5BW are normal, the route governed by signal 6L is complete and the code for clearing this signal may be transmitted without delay. On the other hand, if the route governed by signal 2R requires movement of switch 1W, the code for clearing signal 2R cannot be sent until the control code for operating switch 1W is transmitted and an indication code is received showing that the switch occupies the proper position. There is no reason to delay the code for clearing signal 6L until the route governed by signal 2R is complete, and as signals 2R and 6L are governed through the same field station, it follows that the office equipment should operate to transmit to this field station a control code to clear signal 6L without clearing signal 2R, and must thereafter transmit another control code to clear signal 2R and hold signal 6L at clear.

As hereinafter explained in detail, the office equipment is arranged so that when the route for one of a plurality of signals governed through a field station is complete, the control code for clearing this signal may be transmitted irrespective of the condition of the routes for the other signals governed through the same field station, and so that the control codes for clearing other signals governed through this field station will be automatically initiated when the routes governed thereby are shown to be complete.

If signal 6L is to be cleared, the lever 6LSG is moved to the left and the associated starting button is depressed. When lever 6LSG is moved to the left, the route check relay 6LGS is connected to the network, and assuming that the apparatus is otherwise as shown in Fig. 1B, energy is supplied to relay 6LGS over the circuit which is traced from terminal B over back contact a of relay 4RGS, contact e of lever 4SG, front contact b of relay 3NWK, normal contact g of lever 3SW, contact f of lever 4SG, back contact b of relay 6RGS, contact e of lever 6RSG, contact e of lever 5SW, front contact d of relay 5NWK, contact e of lever 6LSG, back contact b of relay 6RLSTP, back contact a of relay 6LHK, and through the winding of relay 6LGS to terminal C. Accordingly, the contacts of relay 6LGS pick up so that contact a prepares the relay stick circuit, while contact e of relay 6LGS, Fig. 1C, establishes a connection to terminal C to prevent release of relay 3NWK in the event lever 3SW is moved, and contact k of relay 6LGS establishes a connection to terminal C to prevent release of relay 5NWK in the event lever 5SW is moved.

When the push button associated with lever 6LSG is depressed, the relay 6LPBR picks up and closes its contacts a and b, Fig. 1E, in the pick-up circuits for the starting relays 234ST and 235ST, but these circuits are incomplete since the switch levers and indication relays are in agreement. Accordingly, the relays 234ST and 235ST remain released and do not initiate transmission of control codes to the corresponding field stations.

When relay 6LPBR picks up, its contact c, Fig. 1F, establishes a pick-up circuit for relay 6RLST and its contacts pick up so that contact a establishes the relay stick circuit and contact d establishes the pick-up circuit for relay 6RLSTP. The latter circuit is traced from terminal B over contact d of lever 6LSG in its left-hand position, front contact h of relay 6LGS, and front contact d of relay 6RLST to the upper or pick-up winding of relay 6RLSTP and its contacts pick up so that contact c establishes the relay stick circuit, while contact d of relay 6RLSTP transfers a branch of the stick circuit for relay 6RLST to the circuit governed by relays OM and OS.

In addition, when relay 6RLST picks up, energy is supplied from terminal B over contact c of lever 6LSG, front contact j of relay 6LGS, front contact c of relay 6RLST, and back contact b of relay 236S to the circuit leading to relay OM to cause a control code to be initiated.

Referring to Fig. 1B it will be seen that when relay 6RLSTP picks up, its contact b disconnects the relay 6LGS from the network and establishes the relay stick circuit.

Referring to Fig. 1D it will be seen that as lever 6LSG is reversed and relay 6LGS is picked up, energy will be supplied to channel 103—32 during transmission of a control code to station 236 so this code will pick up relay 6LHS, Fig. 2D.

From the foregoing, it will be seen that as the route for the signal 6L is complete at the time the lever 6LSG is reversed and the associated starting button is pressed, the C. T. C. equipment is immediately prepared to transmit a control code to clear the signal, while the route check relay is locked energized to prevent interference with the route or establishment of a conflicting route. Although the C. T. C. equipment is immediately prepared to transmit the control code for clearing signal 6L, the operation of the equipment is such that this code may be delayed a short period until superior control codes are transmitted.

As explained above, the operator also wishes to clear signal 2R for movement of a train over a route which involves movement of switch 1W, as for example to its reverse position. Accordingly, switch lever 1SW is reversed before signal lever 2RSG is reversed, and when lever 2RSG is reversed, the relay 2RGS does not pick up because the network circuit for the relay at this time is open at contacts of the switch lever 1SW and of the indication relays 1NWK and 1RWK.

When the starting button associated with lever 2RSG is pressed, the relay 2RPBR picks up, and referring to Fig. 1E, it will be seen that energy is supplied from terminal B over contacts f of levers 3SW and 5SW, front contact c of relay 2RPBR, reverse contact c of lever 1SW, back contact f of relay 1RWK, and a back contact of push button 235STB to the winding of relay 235ST so that it picks up to establish its stick circuit and to initiate transmission of a control code to station 235. When relay 235ST picks up, its contact e, Fig. 1C, transfers the stick circuit for relay 1NWK to a network circuit which is not connected to terminal C of the source at this time. Accordingly, relay 1NWK releases, and its back contact c is closed to cause energy to be supplied to channel 104—35 during transmission of control codes to station 235 to reverse relay 1WSR, Fig. 2D. After release of relay 1NWK its contact b, Fig. 1B, is open to prevent picking up of relay 2RGS in the event lever 1SW is restored to its normal position.

Referring now to Fig. 1F, it will be seen that when the starting button associated with lever 2RSG is pressed and relay 2RPBR picks up, its contact b establishes a circuit for relay 2RLST and it picks up to establish its stick circuit. As relay 2RGS is released, picking up of relay 2RLST does not establish a circuit for relay 2RLSTP and it remains released and the branch of the stick circuit for relay 2RLST governed over front contact a of relay 236S is connected over back contact d of relay 2RLSTP, contact b of lever 2LSG, and contact d of lever 2RSG to terminal B so that relay 2RLST will not release on picking up of relay 236S.

As explained above, the C. T. C. equipment is prepared to transmit the control code for clearing signal 6L immediately after the lever 6LSG is positioned and the associated starting button is depressed, but this code may not be transmitted for a short period. During the period prior to transmission of the code to station 236 to clear signal 6L, the lever 2RSG may be positioned and the associated starting button pressed to pick up relay 2RLST. However, as relay 2RGS is released, its contact d, Fig. 1D, is open and when the code is sent to station 236 to clear signal 6L, channel 102—34 is deenergized so relay 2RHS, Fig. 2D, is not picked up.

This is desirable since the route for signal 2R is not yet established and if a code for clearing signal 2R should be sent and should pick up relay 2RHS, it might result in clearing of signal 2R for a route other than that intended by the operator, and it might result in release of the lock relays and thereby prevent operation of the switches to establish the intended route.

The circuits for the lamps associated with lever 6LSG are not shown, but are similar to those for the lamps associated with lever 2LSG and shown in Fig. 1G. Referring to Fig. 1G, it will be seen that as relays 6LGS and 6RLSTP are picked up, the lamp 6LE is lighted at normal brilliancy while the lamp 6NLE remains lighted to provide an indication that the route governed by signal 6L is complete and that the control code for clearing this signal will be transmitted.

On the other hand, as relay 2RGS is not picked up and relay 2RLST is energized, the lamp 2RE is dimly lighted to show that a control for clearing signal 2R has been initiated, but that the route governed by this signal is not complete so the control is stored pending completion of the route.

The energy supplied to relay OM over the circuit established by contact j of relay 6LGS and contact c of relay 6RLST causes the office coding unit to transmit a control code to station 236 at the first opportunity. During transmission of this code relay 236S picks up and its contact c transfers the stick circuit for relay 6RLST to the branch governed by contact d of relay 6RLSTP. As relay 6RLSTP is picked up, its contact d connects the stick circuit for relay 6RLST to the wire governed by back contacts of relays OS and OM, and as both of these relays are picked up during the control code, the stick circuit for relay 6RLST is open and relay 6RLST releases and its contact c in the circuit of relay OM is open so the relay 6LGS will not initiate additional control codes.

When relay 236S picks up, its contact a transfers the stick circuit for relay 2RLST to contact d of relay 2RLSTP, but as relay 2RLSTP is released, energy is supplied over contacts of levers 2LSG and 2RSG to the stick circuit for relay 2RLST and it remains picked up during the picked-up period of relay 236S.

Referring to Fig. 1D, it will be seen that when relay 236S picks up energy is supplied to channel 103—32 as relay 6LGS is picked up, but is not supplied to channel 102—34 as relay 2RGS is released. As a result, the relay 6LHS, Fig. 2D, is picked up by this control code but the relay 2RHS remains released.

The operation of the wayside equipment to clear signal 6L after picking up of relay 6LHS, and to transmit indication codes to the office, is substantially the same as described in detail above in connection with signal 2R and need not be repeated.

As previously explained, a control code is transmitted to station 235 to reverse switch 1W. When this switch completes its movement, an indication code is sent to the office to pick up relay 1RWK, and when relay 1RWK picks up, its contact b, Fig. 1B, completes the circuit including contact f of lever 1SW for energizing relay 2RGS. Accordingly, relay 2RGS picks up, and its contact h, Fig. 1F, completes the circuit including front contact d of relay 2RLST for energizing relay 2RLSTP, while contact j of relay 2RGS completes the circuit including contact c of relay 2RLST for supplying energy to relay OM so the office coding unit will transmit another control code to station 236. When relay 2RLSTP picks up, its contact c establishes the relay stick circuit, its contact d transfers the branch of the stick circuit for relay 2RLST from the wire governed by the levers 2LSG and 2RSG to the wire governed by contacts of relays OM and OS, and its contact a removes relay 2RGS from the network and establishes a stick circuit to prevent release of the relay.

Referring to Fig. 1G, it will be seen that when relays 2RGS and 2RLSTP are both picked up, energy of fully voltage is supplied to lamp 2RE and the lighting of this lamp is changed from dim to full brilliance to indicate that the route governed by signal 2R is complete and that the control code for clearing the signal will be transmitted. When this code is transmitted, the relay 2RLST releases as previously explained, while relay 2RHS at the field station picks up to clear signal 2RA as previously described.

The energizing of relays 6LHS and 2RHS initiates transmission of indication codes to the office from field station 236. As explained above, the control code for clearing signal 6L may be transmitted before the route governed by signal 2R is complete. Accordingly, signal 6L may clear and cause an indication code to be sent to the office before the control code for clearing signal 2R is transmitted. When an indication code is transmitted to the office in response to clearing of signal 6L, the relay 236D picks up and interrupts the stick circuit for relay 6RLSTP so that it releases. If at the time this indication code is received at the office the control code for clearing signal 2R has not been transmitted, the relay 2RLSTP will be released and will not be affected by picking up of relay 236D. Similarly, at this time relay 2RLST is picked up, but it is not affected by picking up of relay 236D and remains picked up to store the control code for clearing signal 2R.

On the other hand, if at the time the indication code is received from station 236 the control code for clearing signal 2R has been transmitted, the relay 2RLSTP will be picked up, while the relay 2RLST will be released so that when relay 236D picks up and interrupts the stick circuit for relay 2RLSTP it will release and remain released.

It will be seen, therefore, that regardless of the order of transmission of the control codes and receipt of indication codes, the control code for clearing a signal, such as signal 2R, will remain stored until the route governed thereby is complete, whereupon the code will be transmitted automatically without attention by the operator. The storage of a control code is cancelled when and only when that code is transmitted so that every stored code is certain to be transmitted and so that transmission of a code discontinues the storage of the code with the result that transmission of codes to the field station will not be unnecessarily repeated.

In addition, it will be seen that as soon as the office equipment is in condition to transmit a control code to clear a signal, the relay RLSTP picks up to hold the route check relay picked up. The relay RLSTP is released by the first indication code received subsequent to transmission of the signal clearing control code. As explained above, the field station equipment is arranged so that the first indication code transmitted after receipt of a control code for clearing a signal will pick up the signal indication relay to maintain the route check relay energized unless the signal is put to stop by passage of a train before the first indication code can be transmitted to the office.

The operation of the equipment on movement of trains over the routes established by signals 6L and 2R is similar to that previously described in connection with signal 2R and need not be repeated.

The equipment is arranged so that if at the time the operator initiates a control code for clearing a signal an indication code is being received from the field station through which the indications for that signal are transmitted, the control code will not be cancelled by the indication code but will be stored until it is transmitted. For example, if lever 2RSG is moved to its right-hand position and the push button associated with the lever is pressed so that relay 2RLST picks up, and if conditions are such that relay 2RGS picks up, the relay 2RLSTP will also pick up. The C. T. C. equipment operates in such manner that control codes are transmitted before indication codes, but also so that a control code will not interfere with an indication code which is in progress. Hence, if at the time relays 2RLST and 2RLSTP pick up, an indication code is being received from station 236, the relay 236D may pick up before the control code is transmitted to this station. During the receipt of this indication code the relay 236S also picks up and its contact $a$ transfers the stick circuit for relay 2RLST to contact $d$ of relay 2RLSTP. As relay 2RLSTP is picked up, its contact $d$ connects the stick circuit for relay 2RLST to the wire leading to a back contact of relay OM. The relay OM remains released during receipt of the indication code so it maintains the stick circuit for relay 2RLST. As a result relay 2RLST remains picked up and maintains the supply of energy to the pickup winding of relay 2RLSTP. Accordingly, when relay 236D picks up and interrupts the circuit of the holding winding of relay 2RLSTP, the relay does not release but remains picked up and keeps relay 2RLST picked up. The receipt of the indication code, therefore, does not interfere with storage of the control code and it will be transmitted in the normal manner.

*Operation of equipment to transmit a code to put a signal to stop*

The equipment is arranged so that the operator is always free to prevent transmission of a control code for clearing a signal and is always free to initiate transmission of a code to put a signal to stop after it has been cleared.

The signal control relays RHS and LHS, Fig. 2D, are picked up in response to receipt of a control code in which the associated control channel is energized, and are released in response to receipt of a control code in which the associated control channel is not energized.

Referring to Fig. 1D, it will be seen that the circuits over which energy is supplied to the channels for governing the signal control relays during transmission of control codes to stations 236 and 237 include contacts of the signal levers. Hence, if a signal lever occupies its normal center position, energy will not be supplied to the associated control channel even if the associated route check relay is picked up. Accordingly, any control code transmitted when a signal lever is in its normal position will release the signal control relay governed thereby and thus put the associated signal to stop.

When a signal lever, such as lever 2RSG, is moved to its signal clearing position, the associated route check relay, such as relay 2RGS, will pick up if the route governed by the corresponding signal is complete. When a route check relay is picked up and the signal starting relay, such as relay 2RLST is picked up, the starting relay repeater 2RLSTP picks up to prevent release of the route check relay on restoration of the signal lever to its normal center position. If the signal lever is restored to its normal center position before the control code is transmitted, the control code which is transmitted will not pick up the signal control relay 2RHS, and the resulting indication code transmitted to the office will not pick up the signal indication relay, but will release the starting relay repeater 2RLSTP and thus release the route check relay 2RGS. Hence, under these conditions, the route check relay is maintained picked up to maintain the route and prevent establishment of a conflicting route until an indication code is received from the field location that it is proper for the route to be cancelled. As the first indication code received from the field station releases the route check relay under the conditions outlined above, the route is promptly cancelled so the operator can establish a different route if he desires.

On the other hand, if at the time the signal lever is restored to its normal center position a control code for clearing the associated signal has already been transmitted, another control code to put the signal to stop will be transmitted when the lever is moved and the starting button is pressed. At the field station, the signal control relay, such as relay 2RHS, is picked up by the first control code and is released by the second control code. If conditions at the field location are such that the signal is cleared by picking up of the control relay, the associated approach locking relay, such as relay 2RAS, will release, and will not pick up immediately upon release of the signal control relay. The approach locking relay, when released, causes indication codes transmitted to the office to pick up the signal indication relay and thus prevent release of the route check relay. This prevents interference with the established route, or attempted establishment of a conflicting route, until sufficient time has elapsed for a train to have accepted the signal and entered the route so as to render the detector locking effective, or to have stopped before reaching the signal.

It will be seen that the office equipment is arranged so that the operator is always free to transmit a code to put a signal to stop. As pointed out above, when a signal lever such as lever 2RSG is in its normal center position, any control code sent to the field station through which the corresponding signal is governed will release the signal control relay and put the signal to stop. In addition, when the push button associated with a signal lever is pressed, the starting relay, such as relay 2RLST, governing transmission of codes for controlling the signal is always energized. When the signal lever 2RSG is restored to its normal center position, its contact b completes the circuit including front contact c of relay 2RLST for supplying energy to relay OM to cause the office coding unit to transmit a control code. Hence the office equipment will always operate promptly and without delay to transmit a control code to put a signal to stop.

The circuits just described also operate to automatically cancel stored signal control codes in the event a route cannot be established and the operator changes his plans. As explained above, when a signal, such as signal 2R, is to be cleared, the signal lever is positioned and the starting button is pressed. If the route is not complete, the route check relay 2RGS will not pick up and although relay 2RLST picks up as a result of operation of the push button, the circuit for energizing relay OM is not complete and the office coding unit will not be placed in operation to transmit a code to station 236. If, for any reason, such as failure of a switch to operate as intended, the route governed by signal 2R cannot be established, the relay 2RGS will remain released and will not complete the circuit for supplying energy to relay OM, and no control code will be transmitted to station 236. Accordingly, relay 2RLST will remain picked up and store the signal control code. If lever 2RSG is now restored to its normal center position, the circuit for supplying energy to relay OM is complete and a control code will be transmitted. Since lever 2RSG is in its normal center position and relay 2RGS is released, the circuit for energizing channel 102—34, Fig. 1D, is open and the code transmitted at this time will not pick up relay 2RHS.

As relay 2RGS did not become picked up, the relay 2RLSTP remains released and when lever 2RSG is returned to its normal center position the stick circuit for relay 2RLST is connected to the wire leading to back contacts of relays OM and O8 and the relay 2RLST will be released as a result of transmission of the control code.

As relay 2RGS did not pick up there is no possibility that a control code will have been transmitted which would pick up relay 2RHS so there is no need to check traffic conditions in the field before permitting transmission of codes for operating the track switches or to clear signals other than signal 2R. In this system, if the relay 2RGS does not pick up, the relay 2RLSTP remains released and when the signal lever is restored to its normal center position, the office equipment is restored to its normal condition at once and it is unnecessary to wait for an indication code to be received from the field station to release the relay 2RLSTP.

From the foregoing it will be seen that we have provided improved means for remotely controlling a plurality of track switches and the associated signals through a code type communication system.

Although we have herein illustrated and described only one form of centralized traffic control system for railroads embodying our invention, it is understood that various changes and modifications may be made therein within the scope of the appended claims without departing from the spirit and scope of our invention.

Having thus described our invention, what we claim is:

1. In combination with a railway track layout including electrically interlocked track switches and a first and a second signal governing movements over routes formed by the track switches, a first signal control relay governing said first signal, a second signal control relay governing said second signal, each of said signal control relays having contacts which normally occupy a first position in which they hold the associated signal at stop and are movable to an operated position in which they cause the signal to be controlled by traffic conditions in advance, a code type communication system including a field station for connecting said track layout with a remote control office, said code communication system acting during a single control code operating cycle to position both said first signal control relay and said second signal control relay in accordance with the condition of a first and a second control circuit, respectively, at said office and acting during indication code cycles to position switch indication relays at said office in accordance with the position of said switches, a first and a second signal lever at said office each having a stop and a clear position, a first and a second starting relay associated with said first and said second signal lever respectively, means associated with each signal lever for actuating the associated starting relay, means governed by each starting relay when actuated to cause said code communication system to transmit a control code to said field station, each such means being effective when the associated signal lever is in its clear position to initiate transmission of a control code when and only when the switch indication relays show that the switches establish a route for the signal governed by such lever, said first and second signal levers governing said first and second control circuits in such manner that each of said signal levers is effective when in its clear position to cause control codes transmitted by said code communication system to include an element for operating the corresponding signal control relay only if the switch indication relays show that the switches establish a route for the signal governed by said signal lever, and means for restoring each of said starting relays to normal in consequence of transmission of a control code to said field station, each of said restoring means being effective when the signal lever associated with said starting relay is in its clear position only if the switch indication relays show that the switches establish a route for the signal governed by said signal lever.

2. In combination with a railway track layout including a plurality of separately controllable electrically interlocked track switches and a first and a second signal governing movements over routes formed by the track switches, a first signal control relay governing said first signal, a second signal control relay governing said second signal, each of said signal control relays having contacts which normally occupy a first position in which they hold the associated signal at stop and are movable to an operated position in which they cause the signal to be controlled by traffic conditions in advance, a code type communication system including a field station for connecting said track layout with a remote control office, a switch control lever at said office for each of said separately controllable track switches, said code communication system acting during a single control code operating cycle to position both said first signal control relay and said second signal control relay in accordance with the condition of a first and a second control circuit, respectively, at said office, said code communication system also acting during other control code operating cycles to position each of said switches in accordance with the position of the corresponding switch control levers at said control office and acting during a single indication code cycle to position switch indication relays at said office in accordance with the position of said switches, a first and a second signal lever at said office each having a stop and a clear position, a first and a second route check relay associated with said first and second signal lever respectively, means for actuating each route check relay only when the associated signal lever is in its clear position and the switch indication relays show that the switches establish for the signal governed by such lever the route designated by the switch levers, a first and a second starting relay associated with said first and said second signal lever respectively, means associated with each signal lever for actuating the associated starting relay, means governed by each starting relay when actuated to cause said code communication system to transmit a control code to said field station, each such means being effective when the associated signal lever is in its clear position to initiate transmission of a control code when and only when the route check relay governed by said signal lever is actuated, said first and second signal levers governing said first and second control circuits in such manner that each of said signal levers is effective when in its clear position to cause control codes transmitted by said code communication system to include an element for operating the corresponding signal control relay only if the route check relay governed by said signal lever is actuated, and means for restoring each of said starting relays to normal in consequence of transmission of a control code to said field station, each of said restoring means being effective when the signal lever associated with said starting relay is in its clear position only if the route check relay governed by said signal lever is actuated.

3. In a code type communication system connecting an office and a track layout containing electrically interlocked track switches and having signals for governing traffic movements over the routes formed by the switches, said signals including a first signal governed by a first control relay and a second signal governed by a second control relay, said code communication system including a field station through which said first and said second control relays are governed from said office during a single control code operating cycle of said code communication system, said code communication system including means for positioning each of said switches in accordance with the position of the corresponding switch lever at said office and for positioning switch and signal indication relays at said office in accordance with the position of said switches and the condition of said signals, a signal lever at said office for each of the signals in said track layout, each of said signal levers having a stop and a clear position, the signals levers for said first and second signals each having associated therewith a starting relay together with actuating means therefor, a route check relay which is actuated only when the signal lever is in its clear position and the switch indication relays show that the switches establish for the signal governed by such lever the route designated by the switch levers, a repeater relay for each signal lever which is actuated when the starting and route check relays associated with said signal lever are both actuated, means governed by each of said starting relays when actuated to cause said code communication system to transmit a control code to said field station, each such means being effective when the associated signal lever is in its clear position to initiate transmission of a control code when and only when the route check relay governed by said signal lever is actuated, the control codes transmitted by said code communication system to said field station being governed in such manner that a control code is effective to operate said first or said second control relay to clear the associated signal only when the corresponding signal lever at the office is in its clear position and the route check relay governed by said signal lever is actuated, means for restoring each of said starting relays to normal in consequence of transmission of a control code to said field station, the restoring means for each of said starting relays being governed in such manner that when the signal lever associated with said starting relay is in its clear position the restoring means is effective only if the associated route check relay is actuated, each repeater relay when actuated being restored to normal when the associated starting relay has been restored to normal and an indication code is received which reflects the condition of the signal governed by the signal lever with which said repeater relay is associated, and indication means governed by each of said repeater relays.

4. In control means for a railway track layout including a plurality of track switches and a plurality of signals for governing traffic movements over routes formed by said switches, manually operable switch levers and manually operable signal levers in a remote control office, a code type communication system including at least two field storage units at said track layout with one said field storage unit acting during certain control code operating cycles of said code communication system to position said switches at said track layout in accordance with the position of said switch levers and the other of said field storage units acting during other control code operating cycles to control said signals at said track layout in accordance with the condition of said signal control levers, a switch starting relay at said office effective when actuated to initiate transmission of a control code for said one field storage unit for operating at least a selected one of said switches, a first signal starting relay associated with a first group of said signal levers, a second signal starting relay associated with a second group of said signal levers, each of said signal levers having associated therewith means for actuating the associated signal starting relay, each of said signal starting relays being effective when actuated to govern transmitting means for initiating transmission of a control code to said other field storage unit and each being provided with restoring means for restoring the relay to normal in consequence of transmission of a control code to said other field storage unit, each of said signal levers also having associated therewith means for actuating said switch starting relay when said selected switch is included in the route for the signal governed by said signal lever and the switch indication relays show that said switch is not in the position designated by its switch lever, and means governed by each of said signal levers when in its signal clearing position and operative only when the switch indication relays show that the switches establish for the corresponding signal the route designated by said switch levers to cause control codes to be transmitted to said other field storage unit to clear the corresponding signal and for rendering effective the transmitting and restoring means for the starting relay associated with said signal lever.

5. In a control system for a track layout including a plurality of track switches adapted to be aligned to provide a plurality of routes and having a plurality of signals governing traffic over such routes, said system having a plurality of manually operable switch control and signal control levers at a remote control office for controlling said switches and signals respectively, said system including a code type communication system including a plurality of coding units at said office and cooperating field station coding units at said layout, at least one of said field station coding units controlling and indicating track switches but not signals and another of said field station coding units controlling and indicating signals but not track switches, the combination comprising a starting circuit for each of said office coding units effective when completed to initiate the transmission of control codes from its associated coding unit, a starting relay effective when energized for completing the starting circuit for the one office coding unit cooperating with the switch controlling field station coding units, a starting button associated with said switch control levers effective when operated for energizing said starting relay, a starting button for each signal control lever, a circuit for energizing the starting relay for said one office coding unit which controls switches but not signals completed when any signal lever starting button is operated after the switch control levers for any switches which must be moved to establish the route desired for the signal governed by the operated signal lever have been moved to the positions designating such route, two signal starting relays for the other office coding unit which control signals but not switches, one of said signal starting relays for one group of signal levers and the other of said signal starting relays for another group of signal levers, the signals governed by the one group of levers including signals governing routes which do not conflict with certain routes governed by the signals controlled by the other group of levers, means controlled by the starting button of each signal lever for energizing the signal starting relay for its group, and means controlled by each of said two signal starting relays when energized effective for automatically completing the starting circuit for said other office coding unit following the receipt of indication codes reflecting operation of the track switches to positions which align the route for the signal lever in its clear position.

FRANK T. PASCOE.
ARTHUR L. JEROME.

REFERENCES CITED

The following references are of record in the file of this patent:

UNITED STATES PATENTS

| Number | Name | Date |
|---|---|---|
| 2,141,074 | Young | Dec. 20, 1938 |
| 2,183,155 | Snavely et al. | Dec. 12, 1939 |
| 2,229,249 | Lewis | Jan. 21, 1941 |
| 2,315,034 | Allen | Mar. 30, 1943 |
| 2,343,784 | McCann et al. | Mar. 7, 1944 |
| 2,344,573 | Van Horn | Mar. 21, 1944 |
| 2,410,504 | Judge | Nov. 5, 1946 |